US008525802B2

(12) United States Patent
Kim et al.

(10) Patent No.: US 8,525,802 B2
(45) Date of Patent: Sep. 3, 2013

(54) PORTABLE TERMINAL CAPABLE OF SENSING PROXIMITY TOUCH AND METHOD FOR PROVIDING GRAPHIC USER INTERFACE USING THE SAME

(75) Inventors: Jong Hwan Kim, Seoul (KR); Seon Hwi Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 777 days.

(21) Appl. No.: 12/409,195

(22) Filed: Mar. 23, 2009

(65) Prior Publication Data

US 2009/0244023 A1    Oct. 1, 2009

(30) Foreign Application Priority Data

Mar. 31, 2008  (KR) .................. 10-2008-0029904
May 16, 2008   (KR) .................. 10-2008-0045655

(51) Int. Cl.
*G06F 3/041*    (2006.01)
(52) U.S. Cl.
USPC ......................................................... 345/173
(58) Field of Classification Search
None
See application file for complete search history.

(56) References Cited

U.S. PATENT DOCUMENTS

| 7,091,984 | B1 * | 8/2006 | Clark | 345/587 |
|---|---|---|---|---|
| 2004/0212617 | A1 * | 10/2004 | Fitzmaurice et al. | 345/440 |
| 2006/0101330 | A1 * | 5/2006 | Godley | 715/513 |
| 2006/0139338 | A1 * | 6/2006 | Robrecht et al. | 345/175 |
| 2006/0161870 | A1 * | 7/2006 | Hotelling et al. | 715/863 |
| 2007/0120832 | A1 * | 5/2007 | Saarinen et al. | 345/173 |
| 2009/0244019 | A1 * | 10/2009 | Choi | 345/173 |
| 2009/0289907 | A1 * | 11/2009 | Ruscher et al. | 345/173 |

FOREIGN PATENT DOCUMENTS

| WO | 2007/089766 | 8/2007 |
|---|---|---|
| WO | WO 2008012307 A1 * | 1/2008 |
| WO | 2008/030976 | 3/2008 |

* cited by examiner

*Primary Examiner* — Hoa T Nguyen
*Assistant Examiner* — Mark Fischer
(74) *Attorney, Agent, or Firm* — Lee, Hong, Degerman, Kang & Waimey

(57) ABSTRACT

A mobile terminal is provided. The mobile terminal includes a touch screen for generating input signals in response to a proximity touch or a direct touch of an input medium and displaying a first menu and a controller for determining the proximity touch of the input medium on the touch screen for a predetermined period of time and displaying on the touch screen a second menu for providing a function associated with the first menu.

3 Claims, 46 Drawing Sheets

PORTABLE TERMINAL CAPABLE OF SENSING PROXIMITY TOUCH AND METHOD FOR PROVIDING GRAPHIC USER INTERFACE USING THE SAME

CROSS-REFERENCE TO RELATED APPLICATIONS

Pursuant to 35 U.S.C. §119(a), this application claims the benefit of earlier filing date and right of priority to Korean Application Numbers 10-2008-0029904, filed Mar. 31, 2008 and 10-2008-0045655 filed May 16, 2008, the contents of which are hereby incorporated by reference herein in their entirety.

FIELD OF THE INVENTION

The present disclosure relates to a mobile terminal, specifically to a mobile terminal capable of sensing a proximity touch and a method for providing graphical user interface via the mobile terminal.

BACKGROUND OF THE INVENTION

Typically, a mobile terminal has one or more functions such as performing voice and video communication, data input and output, and data storage.

With such diverse functions, the mobile terminal is evolving into a comprehensive multimedia device that may support various operations, such as capturing images or videos, outputting music or video files, allowing a user to play games, and receiving broadcast content.

In order to embody complex functions, hardware and software implementations are being developed. For example, a user interface environment is provided to allow the user to search for and select various functions.

Recently, mobile terminals have been equipped with a touch screen to provide various user interface environments. A user may now input various commands or select functions while watching a screen image embodied on the display module.

However, the mobile terminal using the conventional touch screen suffers from shortcomings in that various user interface environments may not be provided, because a user may only select a function related to a menu by touching the menu displayed on a screen of a mobile terminal.

Furthermore, the number of menus and icons that may be formed within one screen may be limited due to size constraint of the touch screen. As a result, although many functions are provided via the conventional mobile terminal, a user must access multiple menus in order to execute a particular function.

Specifically, each function provided in the conventional mobile terminal is associated with a menu or icon. Additionally, each menu or icon may include multiple minor classification menus. However, a user must sequentially navigate through multiple menu levels in order to execute a function associated with a specific menu of the multi-staged menu. The sequential navigation of multiple menu levels is inconvenient for the user of the mobile terminal.

Additionally, many users only use a fraction of functions provided by the mobile terminal and are further inconvenienced by having to sequentially navigate through menus for functions that are rarely used.

Thus, in order to execute a particular function of a mobile terminal, the user is inconvenienced by having to sequentially navigate through multiple menus. As a result, the desire to use the mobile terminal is decreased for those who are not familiar with the functional usage of the mobile terminal.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a mobile terminal is provided. The mobile terminal includes a touch screen for generating input signals in response to a proximity touch or a direct touch of an input medium and displaying a first menu and a controller for determining the proximity touch of the input medium on the touch screen for a predetermined period of time and displaying on the touch screen a second menu for providing a function associated with the first menu.

According to one feature the second menu displays a list of frequently used functions from a plurality of functions associated with the first menu. Additionally, the controller recognizes a direct touch of an object displayed in the second menu via the input medium and executes a function associated with the second menu in response to the direct touch of the object displayed in the second menu.

According to another feature, the controller distinguishes a direct touch of the first menu from a proximity touch of the first menu via the input medium, and displays distinct second menus on the touch screen in response to the direct touch operation or the proximity touch operation. Furthermore, the controller recognizes the proximity touch of the input medium on the touch screen if the input medium is within a predetermined distance to the touch screen for a predetermined period of time.

In yet another feature, the controller displays the second menu if the proximity touch of the input medium is on the first menu displayed on the touch screen. Additionally, the controller ceases displaying the second menu from the touch screen if the input medium has deviated from a touch recognition distance of the touch screen without directly touching the second menu via the input medium. Furthermore, the second menu comprises a text object or an icon object.

In still yet another feature, the first menu may be a web page and the second menu executes one of a user's frequently used functions from a plurality of functions associated with the web page. Furthermore, the first menu is an icon displayed in the web browser, and the second menu is a list of recently-accessed web addresses. Additionally, the first menu may be an icon displayed in the web browser, and the second menu is a preview image for the function associated with the first menu.

In accordance with another embodiment a method for providing graphic user interface using a mobile terminal is provided. The method includes sensing an input medium performing a proximity touch on a touch screen displaying a first menu, determining a time which the input medium performs the proximity touch on the touch screen, and displaying on the touch screen a second menu for providing a function associated with the first menu, if the determined proximity touch time is greater or equal to a predetermined period of time.

In still yet another embodiment, a mobile terminal is provided. The mobile terminal includes a touch screen for displaying a first menu and displaying a second menu in response to a proximity touch of the first menu via an input medium on the touch screen, a sensing unit for sensing the proximity touch on the touch screen and a direct touch of the touch screen, and a controller for determining the proximity touch of the first menu via an input medium on the touch screen for a predetermined period of time and displaying the second menu on the touch screen, the second menu for providing a function associated with the first menu, and determining the direct touch of the first menu via an input medium on the touch screen for executing a function associated with the first menu.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

As used herein, the terms "module," "unit," and "part" are used for purposes of facilitating disclosure. Therefore, significant meanings or roles should not be imputed to the terms themselves and it should be understood that the terms "module," "unit," and "part" may be used together or interchangeably.

Figure 1:
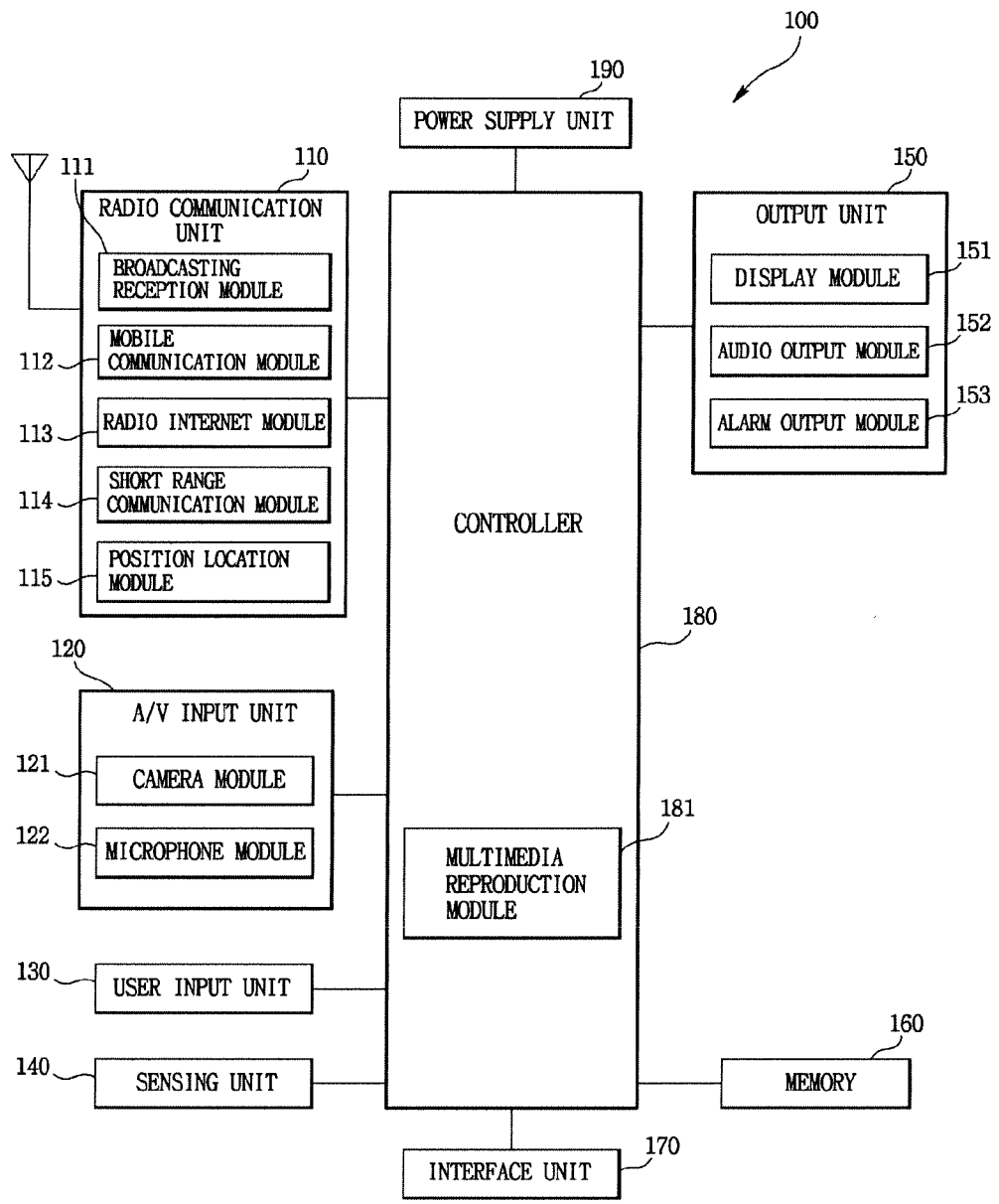
FIG. 1 is a block diagram of a mobile terminal according to an embodiment of the present invention.

By way of non-limiting example only, the embodiments are described with reference to the mobile terminal 100 shown in FIG. 1. However, such teachings apply equally to mobile phones, smart phones, notebook computers, terminals for digital broadcasting, personal digital assistants (PDAs), portable multimedia players (PMPs), navigation devices for GPS, and other types of terminals. Also, FIG. 1 shows the mobile terminal 100 having various components, but it should be understood that implementing all of the illustrated components is not a requirement. Greater or fewer components may alternatively be implemented.

A mobile terminal capable of sensing a proximity touch and a method for providing graphical user interface will be described in detail with reference to the accompanying drawings.

Referring to FIG. 1, the mobile terminal according to the present disclosure will be described in view of constitutional elements according to a function thereof.

Referring to FIG. 1, a mobile terminal 100 may comprise a wireless communication unit 110, an audio/video (A/V) input unit 120, a user input unit 130, a sensing unit 140, an output unit 150, memory 160, an interface unit 170, a controller 180, and a power supply unit 190. When the constituent elements are implemented in actual applications, two or more of the constituent elements may be combined into one constituent element or one constituent element may be divided into two or more constituent elements, if appropriate.

The radio communication unit 110 may include a broadcasting reception module 111, a mobile communication module 112, a radio (wireless) Internet module 113, a short-range communication module 114 and a GPS module 115.

A broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or an electronic service guide (ESG) of a digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal. For example, the broadcasting signal may be received via the mobile communication module 112.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). The broadcast receiving module may also receive multicast signals. Data received by the broadcast receiving module 111 may be stored in a suitable device, such as a memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal. The wireless Internet module 113 may be internally or externally coupled to the terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

The short-range communication module 114 facilitates short-range communications. Suitable technologies for implementing this module include radio frequency identification (RFID), infrared data association (IrDA), ultra-wideband (UWB), as well as the networking technologies commonly referred to as Bluetooth™ and ZigBee™.

The position-location module 115 identifies and obtains the location of the terminal 100. The position-location module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera 121 receives and processes image frames of still pictures or video.

The microphone 122 receives an external audio signal while the portable device is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of the communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and closed state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired or wireless headphones, external chargers, power supplies, storage devices configured to store data, or microphones. The interface unit 170 may be configured using a wired and wireless data port, audio input/output (I/O) ports, or video (I/O) ports. The interface unit 170 may also include a card socket for connecting various cards, such as a memory card, a subscriber identity module (SIM) card, a user identity module (UIM) card, or a replaceable user identity module (RUIM) card.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the user input unit 130, in one embodiment of the present invention. This configuration allows the display 151 to function both as an output device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more of such displays. An example of a two-display embodiment is one in which one display 151 is configured as an internal display which is viewable when the terminal is in an opened position and a second display 151 configured as an external display which is viewable in both the opened and closed positions.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio related to a particular function, such as a call notification, a message notification, or an error notification.

The output unit 150 is further illustrated having an alarm module 153, which may be used to identify the occurrence of an event associated with the mobile terminal 100. An example of such output includes providing a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

A memory 160 may store various types of data to support the processing, control, and storage requirements of the mobile terminal 100. Examples of such data include program instructions for applications operating on the mobile terminal 100, contact data, phonebook data, messages, pictures, and video.

Additionally, data for various patterns of vibration and sound output in response to a touch input on the touchscreen may be stored in the memory 160. Details of the various patterns of vibration and sound will be explained below.

The memory 160 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

The controller may include a multimedia module 181 which provides multimedia playback. The multimedia module 181 may be configured as part of the controller 180 or may be implemented as a separate component.

The controller 180 may identify a proximity touch or a direct touch of the touch screen via an object, such as a finger, and thus allow the touch screen to display distinct graphic user interfaces. For example, the controller 180 may display a second level menu on the touch screen for providing a function associated with the first level menu in response to the proximity touch or direct touch to the first level menu via the input medium.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by a controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The mobile terminal 100 may be implemented in a variety of different configurations. Examples of such configurations include folder-type, slide-type, bar-type, rotational-type, swing-type, and touchscreen-type.

For clarity, further disclosure will primarily relate to a touchscreen-type mobile terminal 100. However such teachings apply equally to other types of mobile terminals 100.

Figure 2:
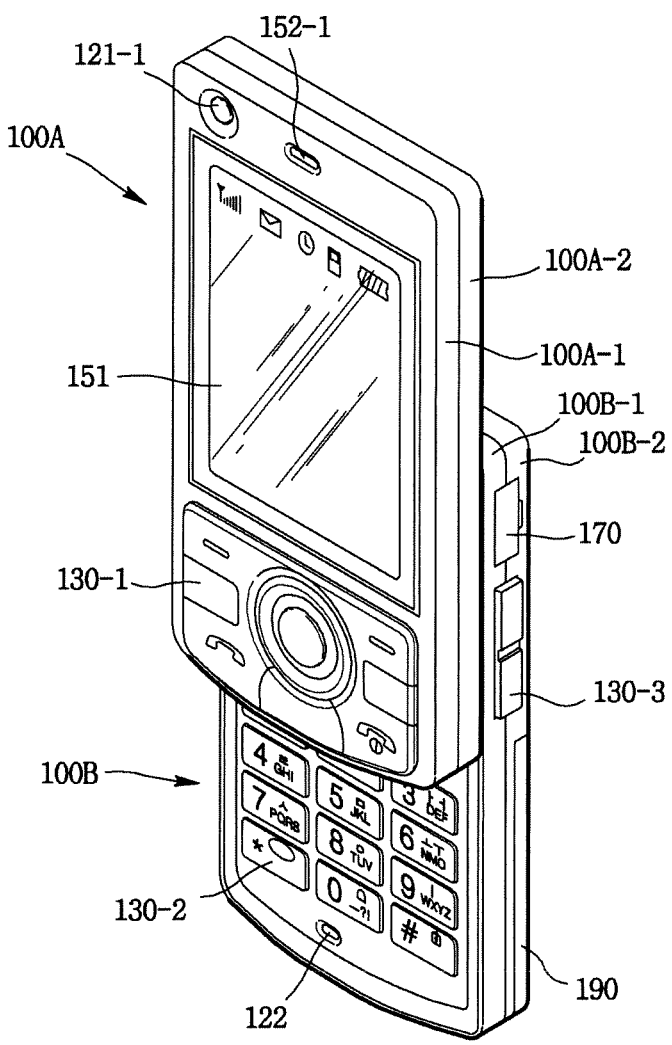
FIG. 2 is a front perspective view of a portable according to an embodiment of the present invention.

FIG. 2 is a perspective view of a front side of a mobile terminal 100 according to an embodiment of the present invention. As illustrated in FIG. 2, the mobile terminal 100 is shown having a first body 100A configured to slidably cooperate with a second body 100B.

The first body 100A is positioned to overlap with the second body 100B in a closed position. Furthermore, as shown in FIG. 2, the first body 100A is positioned to expose at least a portion of the second body 100B in the open configuration.

The mobile terminal 100 is operable in either a standby mode or an active call mode. Typically, the terminal 100 functions in the standby mode when in the closed position and in the active mode when in the open position. The mode configuration may be changed as required or desired by the user.

The first body 100A is formed from a first case 100A-1 and a second case 100A-2 and the second body 100B is formed from a first case 100B-1 and a second case 100B-2. At least one or more intermediate cases may be additionally disposed between the first case 100A-1 and the second case 100A-2. The respective first and second cases may be formed from a suitably rigid material, such as injection molded plastic, or formed using metallic material, such as stainless steel (STS) and titanium (Ti).

The first body 100A and the second body 100B may be sized to house electronic components necessary to support operation of the mobile terminal 100.

The first body 100A is illustrated having a camera 121-1 and audio output module 152-1. The camera 121-1 may be selectively positioned such that the camera may rotate or swivel relative to the first body 100A.

The first audio output module 152-1 may be implemented as a receiver or a speaker to output various types of sounds. The camera 121-1 may be implemented for capturing still images, moving images, videos, or other visual information. Finally, the user input unit 130-1 receives user commands for controlling network contents reproduction and travel guide operations.

The display 151 may implemented as an LCD, or an OLED. The display 151 may also be configured as a touch-screen having an underlying touchpad which generates signals responsive to user contact with the touchscreen.

The second body 100B is illustrated as having a second user input unit 130-2 disposed on the second body 100B, specifically, on a front face portion of the second front case 100B-1. A third manipulation unit 130-2, a microphone module 122, and an interface unit 170 may be disposed on at least one of the second front case 100B-1 or the second rear case 100B-2.

The first to third user input units 130-1, 130-2, 130-3 may be collectively referred to as the user input unit 130, and any means may be employed as the first to third manipulation 130-1, 130-2, 130-3 so long as it may be operated in a tactile manner.

For example, the user input unit 130 may be implemented via one or more dome switches or touch pads that may receive a user command or information according to a user's tactile operation. Additionally, the user input unit 130 may be implemented via a mechanical manipulation means, such as a rotatable element including a wheel, dial, jog button, or a thumbwheel, or a linear movement element, such as a joystick, lever, or a knob.

The first manipulation unit 130-1 may comprise one or more function keys configured for a user to enter commands such as 'start', 'stop', or 'scroll'. The second user input unit 130-2 may comprise one or more keypads used for inputting numbers, characters, and symbols. The third manipulation unit 130-3 may be configured for activating a special function of the mobile terminal. The microphone module 122 may be suitably implemented for receiving a voice of the user or other sounds.

The interface unit 170 may be configured to provide a link for data to be exchanged with an external device via a wired or wireless medium. For example, the interface unit 170 may be at least one of a connection port used for connection of an earjack, earphones, a communication port for short-range communications, such as an IrDA port, a Bluetooth™ port, or a wireless LAN port, and a power supply port used for supplying power to the mobile terminal.

The power supply 190 provides power to the various components of the terminal 100. The power provided may be internal power or external power.

Figure 3:
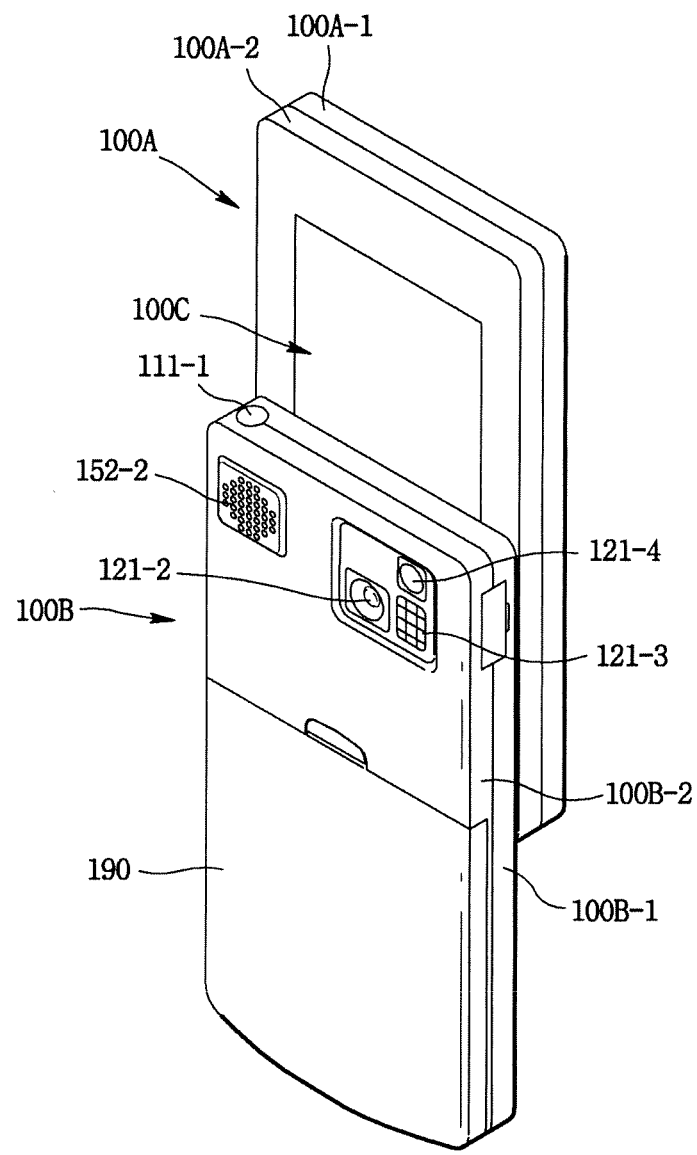
FIG. 3 is a rear perspective view of a mobile terminal of FIG. 2.

FIG. 3 illustrates a rear perspective view of the mobile terminal according to an embodiment of the present invention.

Referring to FIG. 3, a camera 121-2 may be mounted on the rear surface of the second rear case 100B-2. The camera 121-2 faces a direction opposite to a direction faced by the camera 121-1 and camera 121-2 of the second body 100B may have the same or different capabilities. For example, the module 121-1 operates with a relatively lower resolution than the camera 121-2. Such an arrangement works well during a video conference in which reverse link bandwidth capabilities may be limited. The relatively higher resolution of the camera 121-2 of the second body 100B is useful for obtaining higher quality pictures.

A flash 121-3 and a mirror 121-4 may be adjacently disposed at the camera 121-2. When an image of a subject is captured by the camera 121-2, the flash 150 illuminates the subject. The mirror 121-4 allows the user to see himself when he wants to capture his own image via the camera 121-2.

A second audio output module 152-2 may be disposed on the second rear case 100B-2, and may implement a stereophonic function in conjunction with the first audio output module 152-1 and may be also used in a speaker phone mode for call communication.

A broadcasting signal reception antenna 111-1 may be disposed at one side of the second rear case 100B-2. The antenna 111-1 may be installed such that it may be extended from the second body 100B.

A slide module 100C may slidably connect the first body 100A with the second body 100B. A portion of the slide module 100C may be disposed on the first rear case 100A-2 of the first body 100A, while a second portion of the slide module 100C may be disposed on the second front case 100B-1 of the second body 100B.

It is understood that the illustrated arrangement of the various components of the first body 100A and the second body 100B may be modified as desired. Some or all of the components of one body may alternatively be implemented on the other body. In addition, the location and relative positioning of the components are not critical to many embodiments and, therefore, the components may be positioned at locations which differ from those illustrated by the representative figures.

Figure 4:
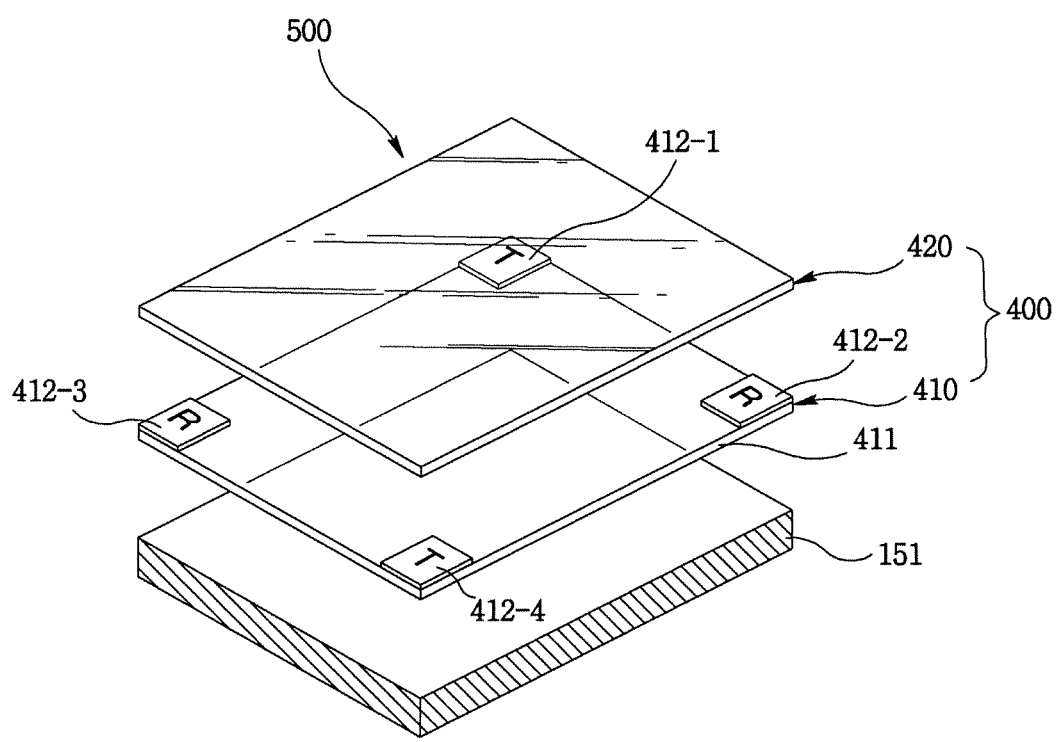
FIG. 4 is a schematic view illustrating a structure of a touch screen according to an embodiment of the present invention.

FIG. 4 is a schematic view illustrating a structure of a touch screen according to an embodiment of the present invention.

Referring to FIG. 4, the display module 151 may be placed on the touch pad 400 in a layered manner to allow operating as a touch screen.

The touch pad 400 illustrated in FIG. 4 may include a squared conduction film 411 made of transparent conductive material such as ITO (Indium Tin Oxide) and metal electrodes 412-1 to 412-4 each formed at each edge of the conductive film 411. The conductive film 411 may be covered with a protective film 420.

The touch pad 400 may be formed with electric field lines between transmission side metal electrodes 412-1, 412-4 and reception side metal electrodes 412-2, 412-3 by an AC (alternating current) voltage applied to the transmission side metal electrodes 412-1, 412-4. The formed electric field lines are extended to the outside of the touch pad 400 via the protective film 420. According to an embodiment of the current invention the touch pad 400 may be a position detection device which may detect a capacitive input.

As a result, when an input medium, such as a user's finger, approaches the touch pad 400 or directly touches the touch pad 400, the electric field lines are partially interrupted to change the phase and size of the current flowing to the reception side metal electrodes 412-2, 412-3. The human body has a static capacity of several pFs relative to the ground and may distort the electric field lines formed on the touch pad 400 when a user touches the touch pad 400 or brings a finger near the touch pad 400.

The mobile terminal 100 may utilize the current change of the reception side metal electrodes 412-2, 412-3 to detect a distance of the input medium and a position where the touch occurred. Additionally, the object may include any object capable of distorting the electric field lines formed on the touch pad 400.

Figure 5:
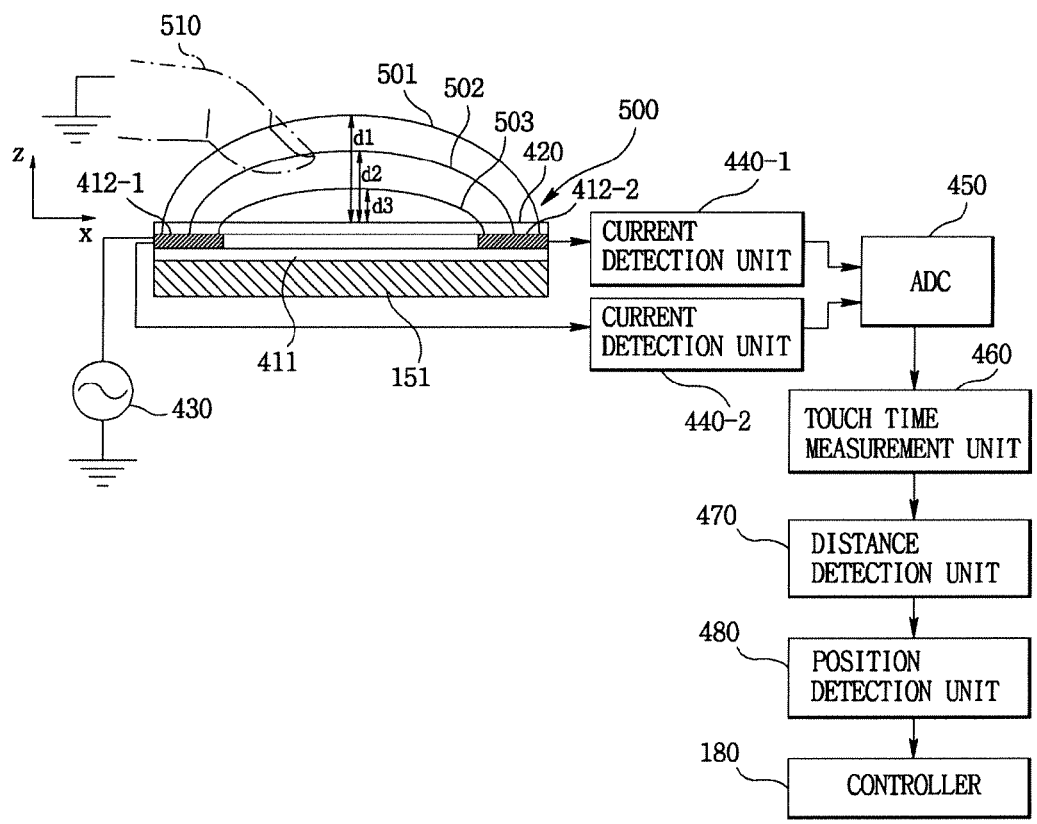
FIG. 5 is a schematic view illustrating a principle for detecting a proximity distance of an input medium using the touch screen of FIG. 4.

FIG. 5 is a schematic view illustrating a principle for detecting a proximity distance of an input medium using the touch screen of FIG. 4.

Referring to FIG. 5, application of AC voltage 430 to the transmission side metal electrode 412-1 formed on the transparent conductive film 411 forms electric field lines, such as electric lines of force 501-503, between the transmission side metal electrode 412-1 and the reception side metal electrode 412-2. The electric field lines 501-503 may be formed in a vertical upward direction, such as the z axis, of the touch screen 500.

The number of electric field lines 501-503 interrupted by a finger 510 may be distorted according to the distance between the touch screen 500 and the finger 510. Specifically, as the finger 510 approaches the touch screen 500, the finger 510 may increase the distortion applied to the electric field lines 501-503.

As stated above, the distortion applied to the electric field lines 501-503 from the finger 510 distorts the current applied to current detection units 440-1, 440-2 connected to the metal electrodes 412-1, 412-2, where the current detection units 440-1, 440-2 detect the changed current and provide the change to an ADC (Analog-to-Digital Converter) 450. The ADC 450 converts the detected changed current, which is an analog signal, to a digital value and provides the digital value to a touch time measurement unit 460.

The touch time measurement unit 460 measures the amount of time the finger 510 is within a touch identification distance, such as "d1" of FIG. 5. The touch identification distance refers to the distance which the touch screen 500 is capable of identifying the proximity of the finger 510. The touch identification distance may be calculated by the amount of current distortion provided by the ADC 450. The touch time measurement unit 460 may recognize that a proximity touch or a direct touch is performed if the finger 510 remains within the touch identification distance, such as "d1", for a predetermined time. Alternatively, if the finger 510 remains within the proximity touch identification effective distance for less than a predetermined time the touch time measurement unit 460 may determine that the proximity touch or the direct touch is not being performed.

The touch time measurement unit 460 may provide information regarding the touch input and current change amount to a distance detection unit 470 if it is determined that there is a touch input in response to the proximity touch or direct touch operation relative to the touch screen 500.

The distance detection unit 460 may calculate a distance between the finger 510 and the touch screen 500. For example, the distance detection unit 460 may provide a distance between the touch screen 500 and the finger 510 in the vertical upward direction, such as the z axis. The distance information may be calculated via the amount of current change.

Specifically, if the finger 510 is positioned at a location in the "d1" region, the distance detection unit 460 may determine that the finger 510 has entered the touch identification effective distance and may provide a function corresponding to the proximity touch operation. The proximity touch is defined by a state of an input medium, such as a user's finger, being positioned within the touch identification effective distance of the touch screen 500 for inputting a user command. The proximity touch of the input medium may be distinguished from the direct touch operation that directly touches the touch screen 500 via the input medium.

Furthermore, if the finger 510 is positioned on a location in the "d2" region, the distance detection unit 460 may determine that the finger 510 has approached the touch screen 500 within a certain proximity. Additionally, if the finger 510 is positioned in the "d3" region or the finger 510 has directly touched the surface of the touch screen 500, the distance detection unit 460 may determine that the finger 510 has directly touched the touch screen 500 within a predetermined error range.

Although the touch operation of the finger 510 has been described in three steps according to the distance between the finger 510 and the touch screen 500, the description of the touch operation may be classified to four steps for further accuracy.

A position detection unit 480 may calculate a position of the finger 510, such as on the x and y axis, on the touch screen 500 via the distorted current amount. The y axis is a vertical direction relative to the x and z axis illustrated in FIG. 5.

The measured vertical distance between the finger 510 and the touch screen 500 and the horizontal coordinate of the finger 510 on the touch pad 400 may be transmitted to the controller 180. The controller 180 may determine the user command according to the vertical distance and the horizontal coordinate to perform a control operation in response to the user command and concurrently provide a predetermined graphic user interface (GUI).

Figure 6:
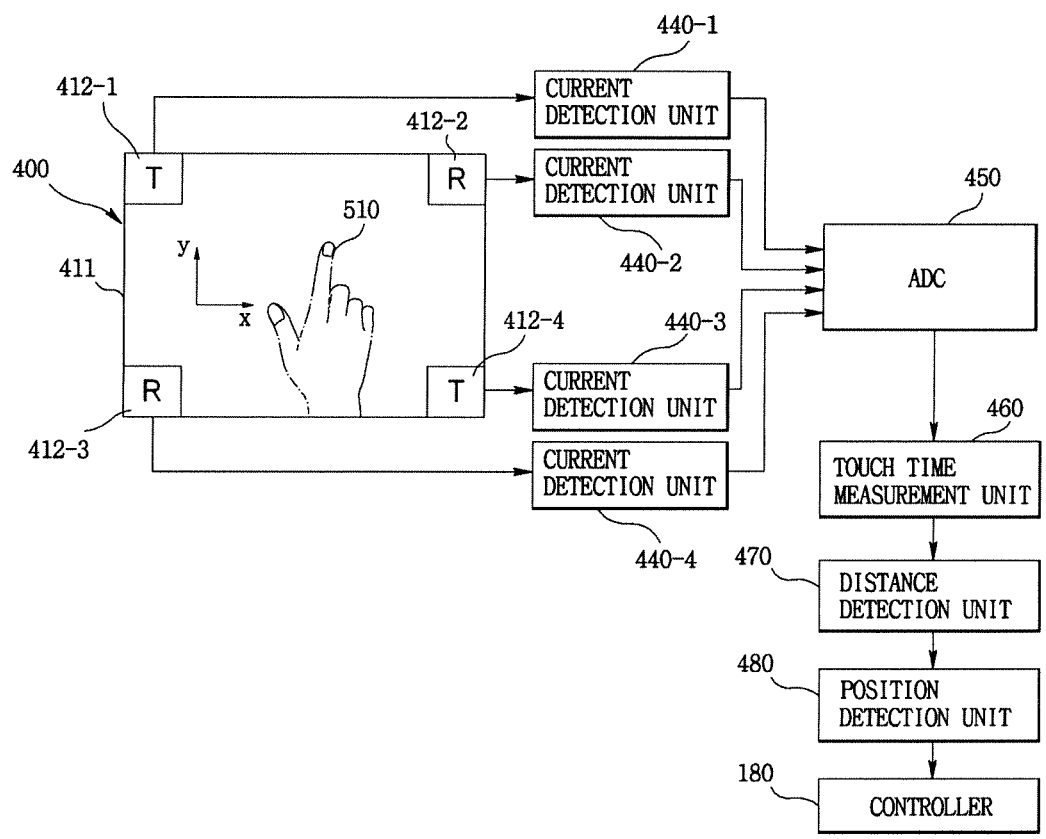
FIG. 6 is a schematic view illustrating a position detection principle of an input medium using the touch screen of FIG. 4.

FIG. 6 is a schematic view illustrating a position detection principle of an input medium using the touch screen illustrated in FIG. 4.

Referring to FIG. 6, when an AC voltage is applied from the AC voltage source to the transmission side metal electrodes 412-1, 412-4 of the touch panel 400, electric field lines (not shown) are formed between transmission side metal electrodes 412-1, 412-4 and the reception side metal electrodes 412-2, 412-3.

Additionally, if the finger 510 approaches the touch panel 400 or directly touches the touch panel 400, current distortions are generated to the metal electrodes 412-1 to 412-4. The current detection units 440-1-440-4 measure the current changes, and as described above, the position detection unit 470 detects the horizontal coordinate, such as the x-y coordinate, located on the touch panel 400 of the finger 510 via the current changes and provides the coordinate to the controller 180. The controller 180 may determine the horizontal coordinate on the touch screen 500 from the finger 510, and thus may execute the user command corresponding to the touch operation. Additionally, the controller 180 may provide a predetermined graphic user interface (GUI) corresponding to the touch operation to the display module 151.

Although FIGS. 5 and 6 have described the touch time measurement unit 460, the distance detection unit 460, and the position detection unit 480 separately according to their functions, these units 460, 470, 480 may be formed within the controller 180. Additionally, the touch screen 500 equipped with the touch panel 400 according to a capacitance detection type has been exemplified in FIGS. 4, 5, and 6 to explain the principle of determining the proximity touch and direct touch of input medium relative to the touch screen 500. However, there is no limit to the arrangement of the metal electrodes 412-1-412-4 of the touch panel 400 or the type of touch panel 400 in order to provide the function for detecting the position indicated by the input medium and the distance between the input medium and the touch screen 500.

For example, the touch panel 400 may detect a proximity position between the input medium and the touch panel 400 via a photoelectric sensor utilizing laser diodes and light emitting diodes, a high frequency oscillation proximity sensor, and an electromagnetic proximity sensor. The touch panel may also be embodied by combining the capacitance detection type and the resistive sensing type by forming metal electrodes on an upper plate or a lower plate for detecting voltage changes according to a position pressed by the input medium.

FIGS. 7a to 7d are schematic drawings illustrating a method for providing a graphic user interface using a mobile terminal capable of sensing a proximity touch sensing function according to an embodiment of the present invention.

Referring to FIGS. 7a to 7d, the touch pad 400 of the mobile terminal 100 may be overlaid on the display module 151 in a layered manner allowing the display module 151 to operate as a touch screen, whereby the user may input a user command via the screen while viewing the screen. Additionally, the touch screen 500 may distinguish a proximity touch operation from a direct touch operation of an input medium, whereby mutually different input signals may be generated in response to the proximity touch operation and the direct touch operation. Therefore, the user may use his or her finger 510 to input user commands as the touch screen 500 is proximity-touched or direct-touched.

Figure 7B:
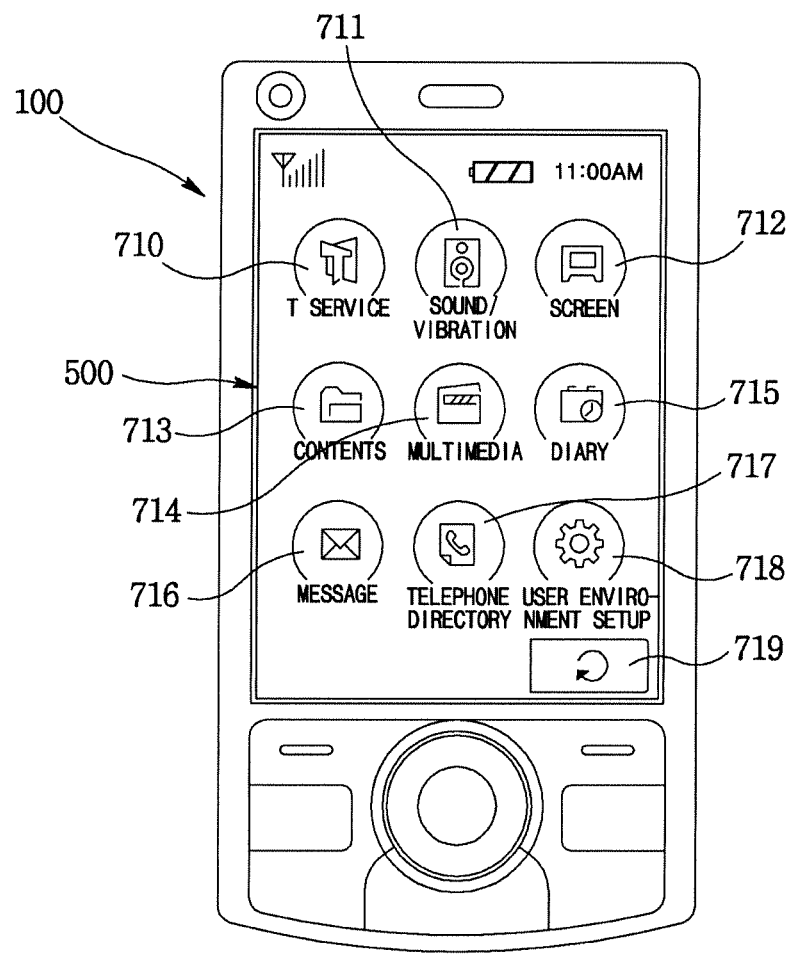
FIGS. 7a to 7d are schematic drawings illustrating a method for providing a graphical user interface using a mobile terminal capable of sensing a proximity touch sensing function according to an embodiment of the present invention.
Figure 7A:
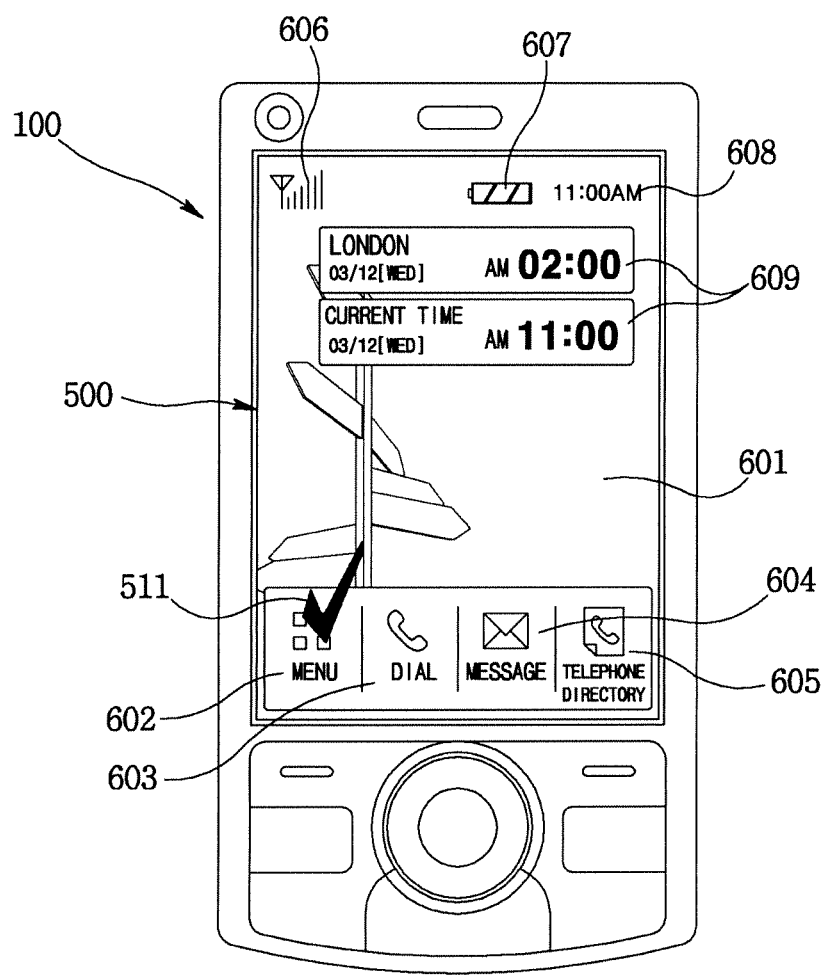

FIG. 7a is a schematic drawing illustrating a graphic user interface provided to the touch screen during a direct touch operation of the input medium according to an embodiment of the present invention.

FIG. 7a illustrates an initial object displayed on an initial screen of the mobile terminal 100. The initial screen refers to a first screen displayed on the touch screen when the mobile terminal 100 is turned on. The object defined in the present invention may include various user interface objects that may be displayed on the touch screen 500 such as text, menus, icons, and lists including characters, numbers, symbols, figures, photos, images, and moving images.

Referring to FIG. 7a, the initial screen of the mobile terminal 100 is displayed with an initial object 601 displayed in the viewing area of the touch screen 500. A menu may be displayed at a lower area of the touch screen 500 and may include a plurality of icon objects 602-605 including a menu execution icon 602, a dial execution icon 603, a message execution icon 604, and a telephone directory execution icon 605. Furthermore, the touch screen 500 may display an upper indicator area with indicator objects including an icon 606 indicating the mobile terminal's signal strength, an icon 607 indicating a battery charge level, and an icon 608 indicating a current time. The icons 606, 607, and 608 may overlap the initial object 601. Additional indicator objects may be displayed below the icons 606, 607, and 608, such as an object 609 for indicating a current time.

The check mark 511 indicates that an input medium has selected the menu execution icon 602.

As illustrated in FIG. 7b, if the input medium selects the menu execution icon 602, the controller 180 determines the icon selected and displays icons 710-718 comprising the first level menu on the touch screen 500. The first level menu may include a "T service" icon 710 for various added services, a "sound/vibration" icon 711 for configuring sound and vibration, a "screen" icon 712 for configuring various screens of the mobile terminal 100, a "contents" icon 713 for storing various contents, a "multimedia" icon 714 for executing photographing and multimedia functions, a "diary" icon 715 for management of tasks, a "message" icon 716 for managing transmission and reception of messages, a "telephone directory" icon 717 for managing a telephone directory, and a "user environment setup" icon 718 for configuring a user environment relative to the mobile terminal 100.

The menu execution icon 602 of FIG. 7a may be referred to as a first level menu object. The icon objects 710-718 displayed on the touch screen 500 may be referred to as second level menu objects which are associated with the menu execution icon 602. Thus, the second level menu objects, such as icon objects 710-718, associated with the first level menu object may be displayed on the touch screen 500 by selecting the first level menu object, such as the menu execution icon 602.

Furthermore, the return icon 719 of FIG. 7b, displayed on the touch screen 500, may be selected in order to return to the former screen state, such as the display illustrated in FIG. 7a.

A multi-staged menu tree structure for the mobile terminal 100 according to the present invention and functions executed by each menu will be described with reference to FIGS. 8 and 9.

Figure 8:
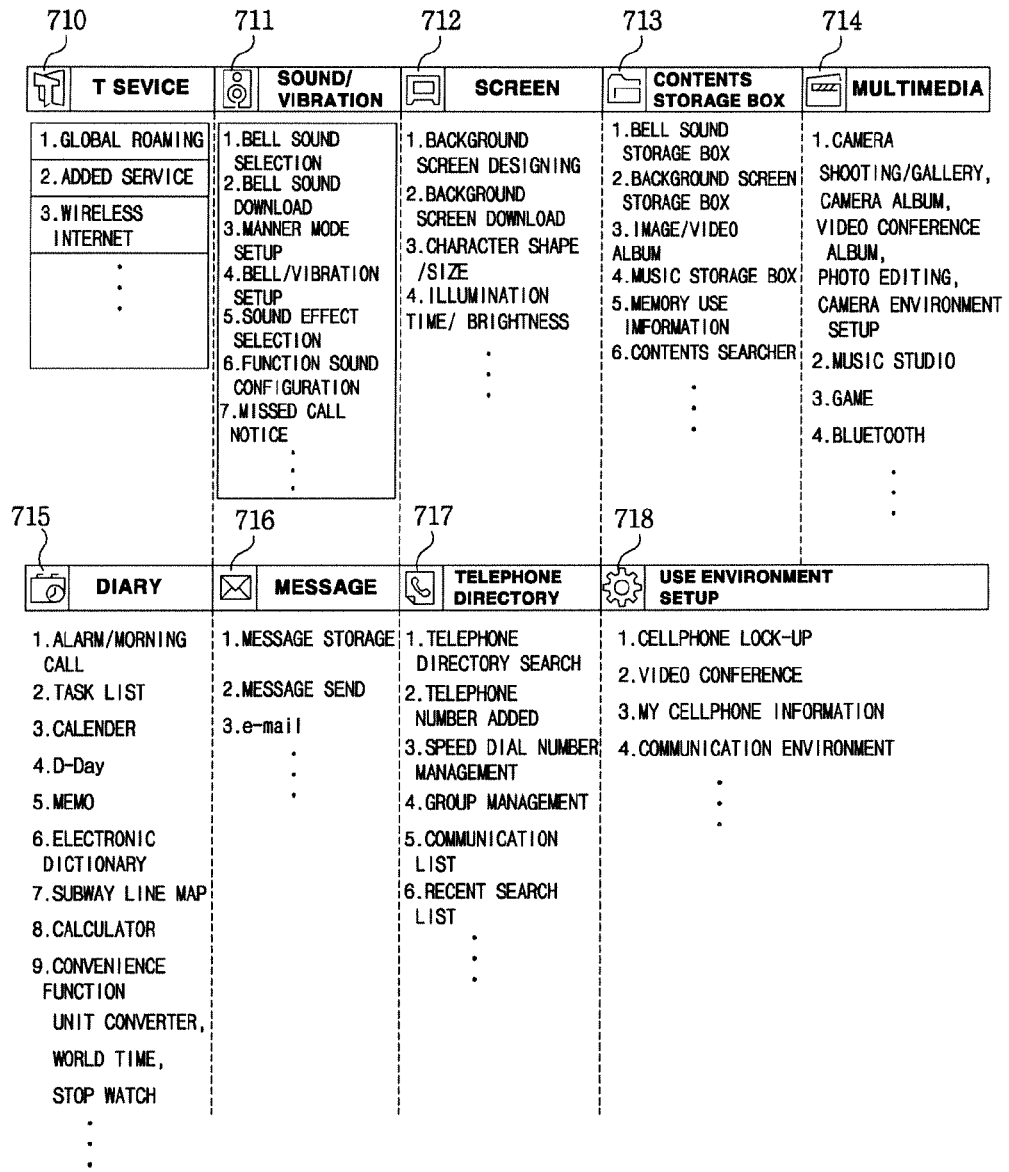
FIG. 8 is a schematic drawing illustrating sub-menus that may be associated with various menus of the mobile terminal according to an embodiment of the present invention.

FIG. 8 illustrates a schematic drawing for configuration of second level menu objects of the mobile terminal according to an embodiment of the present invention. As illustrated in FIG. 8, the first level menu may include a "T service" icon object 710, a "sound/vibration" icon object 711, a "screen" icon object 712, a "contents storage box" icon object 713, a "multimedia" icon object 714, a "diary" icon object 715, a "message" icon object 716, a "telephone directory" icon object 717, and a "user environment setup" icon object 718. Each icon object 710-718 may be associated with one or more lower level objects associated with various functions.

For example, the "T service" icon object 710 may be associated with lower level objects, such as, but not limited to, "1.global roaming" for providing a global roaming function, "2.added services" for registering and executing added services of a mobile communication provider, and "3.wireless Internet" for connecting to the wireless Internet. The third level menu objects may be classified as a single list object.

The "sound/vibration" icon object 711 may be associated with various third level menu objects, such as, but not limited to, "1.ring tone selection" for setting the type and volume of a ring tone, "2.ring tone download" for downloading a desired ring tone, "3.manner mode setup" for setting up volume of a ring tone or intensity of a vibration, "4.bell/vibration setup" for selecting whether to provide a ring tone or a vibration, "5.sound effect selection" for setting up sound effect, such as, a power-on sound and a power-off sound, "6.function sound configuration" for setting up sounds associated with a function of a mobile terminal 100, such as, a battery charge warning sound or a communication access sound, and "7.missed call notice" for notifying a user of a missed call.

The "screen" icon object 712 may be associated with various third level menu objects, such as, but not limited to, "1.background screen designing" for setting up a screen for a waiting screen, a call reception screen, and a call transmission screen, "2.background screen download" for displaying an image on the screen, the image may be an image which is set by a manufacturer, downloaded from the Internet, and uploaded by the user, "3.character shape/size" for setting up a font and font size of characters displayed in the mobile terminal 100, and "4.illumination time/brightness" for setting up illumination time and illumination brightness according to a power saving mode.

The "contents storage" icon object 713 may be associated with various third level menu objects, such as, but not limited to, "1.ring tone storage" for browsing one or more ring tones stored in the storage 160 of the mobile terminal 100 and selecting a ring tone and volume of the ring tone, "2.backgound screen storage" for browsing one or more images stored in the storage 160 of the mobile terminal 100 and selecting a background image, "3. image/video album" for displaying one or more photo or video files stored in an album on a screen in a reduced photo format, such as a thumbnail, "4.music storage" for storing and reproducing music files, such as an MP3 file, "5.memory use information" for displaying the memory usage for the content stored in storage 160, and "6.contents searcher" for searching content stored in one of an embedded memory and an external memory.

The "multimedia" icon object 714 may be associated with various third level menu objects, such as, but not limited to, "1.camera" for capturing, storing, and transmitting images and videos, "2.music studio" for applying music and effects to a photograph or video stored in the mobile terminal 100, "3.game" for providing a game function, and "4.BlueTooth" for providing a short-distance wireless communication function. Furthermore, "1.camera" may be associated with additional objections, such as, but not limited to "shoot/gallery" for capturing and displaying pictures and videos, "camera album" for browsing the pictures and videos, "video conference album" for storing images and videos that may replace a screen displayed to an opposite party during a video conference, "photograph editing" for editing the photographs stored in the mobile terminal 100, and "camera environment setup" for adjusting variables associated with capturing images and videos, such as white balance and sound.

The "diary" icon object 715 may be associated with various third level menu objects, such as, but not limited to, "1.alarm/morning call" for outputting a sound or a vibration at a predetermined time, "2.task list" for managing a daily schedule, "3.calender" for calendaring important dates and providing an alarm associated with the calendared dates at a predetermined time, "4.D-day" for setting up a specific date and outputting days remaining to the specific date or the days which have passed since the specific date, "5.memo" for providing functions of preparing, storing and editing a brief memorandum, "6.electronic dictionary" for providing a word search function, "7.subway line map" for providing subway lines and a current position of a user, "8.calculator" for providing a calculator function, and "9.convenience function" for providing functions of various user conveniences. A second level menu of the "9.convenience function" text object may be connected to text objects including "unit converter", "world time" and "stop watch".

The "message" icon object 716 may be associated with various third level menu objects, such as, but not limited to, "1.message storage" for storing messages, "2.message sending" for preparing and transmitting messages, and "3.e-mail" for preparing, storing, transmitting, and receiving e-mails.

The "telephone directory" icon object 717 may be associated with various third level menu objects, such as, but not limited to, "1.telephone directory search" for managing a telephone directory stored in the mobile terminal 100, "2.telephone number addition" for storing a new telephone number within the mobile terminal 100, "3.speed dial number management" for associating a telephone number stored in the mobile terminal 100 with a specific key of the mobile terminal 100, "4.group management" for classifying and managing telephone numbers in designated groups, "5.communication list" for providing a list containing dialed calls, received calls, and missed calls, "6.recent search list" for providing recently-searched results out of telephone numbers stored in the telephone directory.

The "user environment setup" icon object 718 may be associated with various third level menu objects, such as, but not limited to, "1.cellphone lock-up" for providing a lock-up function of the mobile terminal 100, "2.video conference" for providing information regarding an image communication, such as transmitting an image to another mobile device, "3.my cellphone information" for checking information such as, the telephone number, model name, and software version of the mobile terminal 100, and "4.communication environment" for setting up a data communication environment, such as the settings for wireless Internet access.

Figure 9:
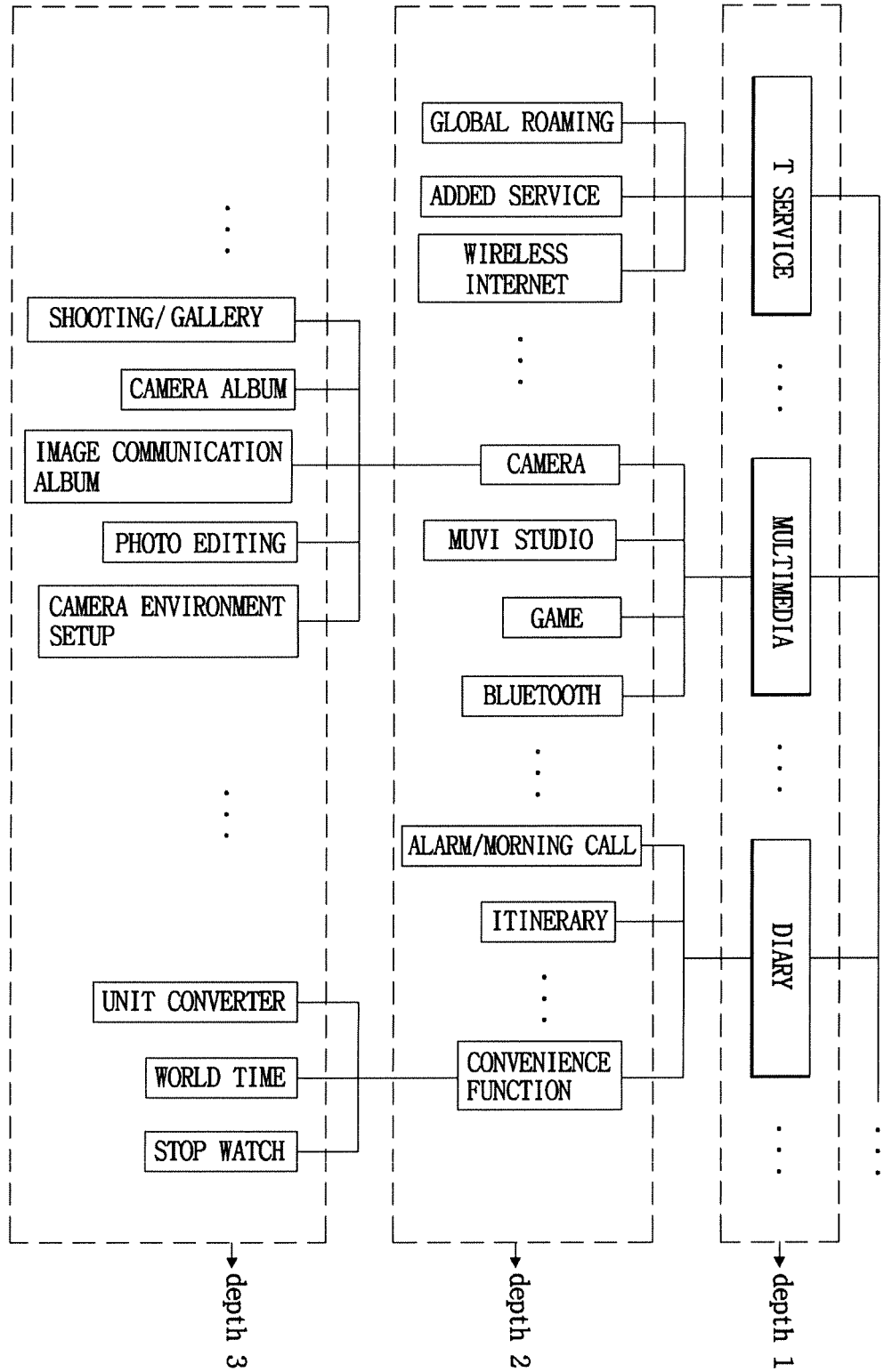
FIG. 9 is a schematic drawing illustrating a menu tree structure of the mobile terminal according to an embodiment of the present invention.

FIG. 9 is a schematic drawing illustrating a menu tree structure of the mobile terminal according to an embodiment of the present invention.

As illustrated in FIG. 9, a menu tree structure according to the present invention may include a first level menu, a second level menu associated with the first level menu, and a third level menu associated with the second level menu. The first, second and third level menus may be associated, respectively, with depth 1, depth 2, and depth 3, and may be sequentially classified into a greater depth level, such as a fourth level menu, fifth level menu, etc.

Hereinafter, a graphic user interface provided to the touch screen 500 will be described according to the configuration of the first level menu.

Figure 7C:
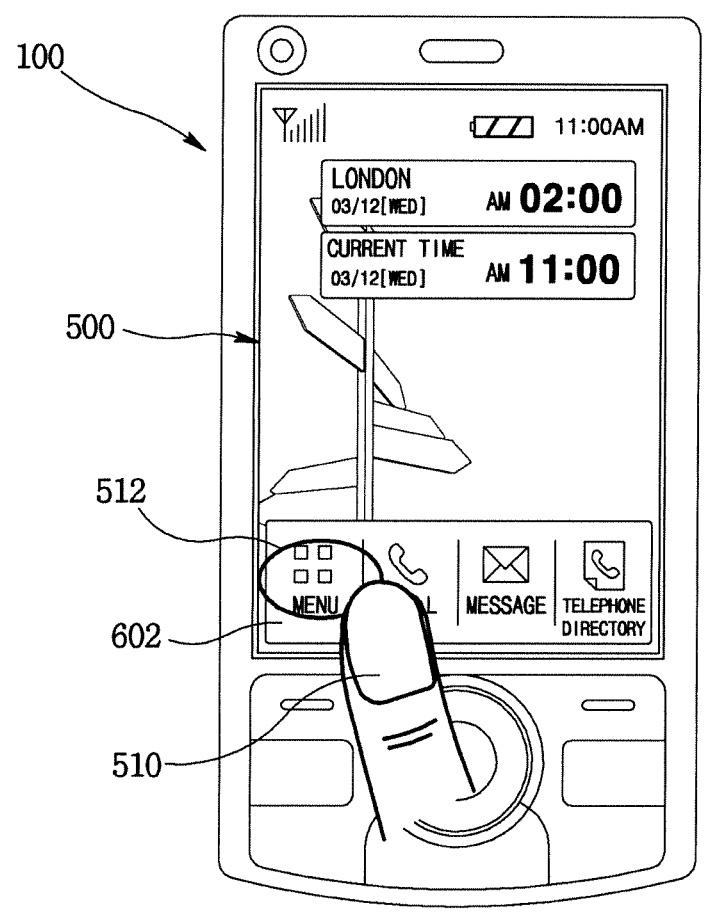

FIG. 7c is a schematic drawing illustrating a graphic user interface of the touch screen during the proximity touch operation of an input medium according to one embodiment of the present invention.

Referring to FIG. 7c, a selection marker 512 may be displayed if an input medium, such as a finger 510, has proximately touched the menu execution icon 602 displayed on the touch screen 500 within a touch identification recognition distance of the touch screen 500.

Figure 7D:
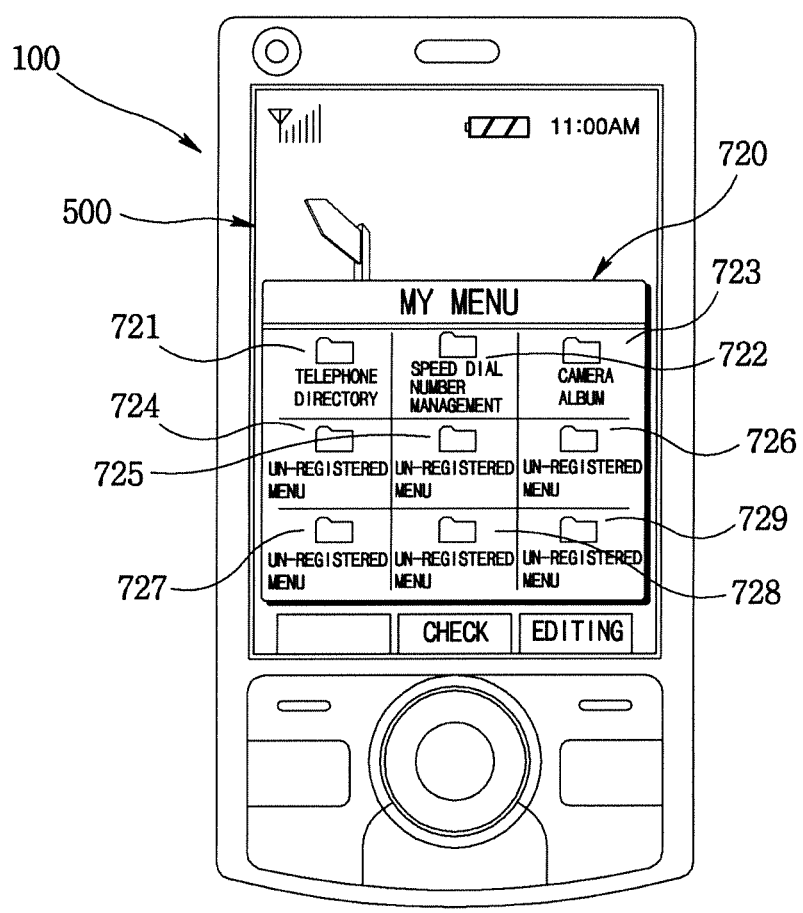

Thus, as illustrated in FIG. 7d, the controller 180 may display a lower menu object 720 after determining the proximity touch operation has been executed if the input medium 510 proximately touches the menu execution icon 602 for more than a predetermined period of time.

The lower menu object 720 may include frequently used menus 721-729 registered within the mobile terminal 100 thus allowing a user to execute a frequently-used function. As illustrated in FIG. 7d, a "telephone number search" menu 721, a "speed dial number management" menu 722 and a "camera album" menu 723 have been registered as a frequently used menu, and other menus 724-729 represent non-registered menus which may be available for registration as a frequently used menu. The menu execution icon 602 may be associated with an upper menu object, and the frequently used menus 721-729 may be associated with a lower menu object 720 which may be associated with the menu execution icon 602.

According to one embodiment of the present invention, a user may execute the function on the mobile terminal 100 by displaying the lower menu object associated with the upper without searching through a multi-staged menu tree associated with the first level menu. For example, the controller 180 may determine a direct touch operation and may execute a function associated with the "telephone number search" menu 721 if the input medium 510 selects the "telephone number search" menu 721 from the frequently used menus 721-729.

Additionally, the controller 180 may display the screen illustrated in FIG. 7c if the input medium 510 deviates from the touch identification distance of the touch screen 500 without selecting one of the frequently used menus 721-729.

FIGS. 10a to 10d are schematic drawings illustrating a method for providing a graphic user interface using a mobile terminal capable of sensing a proximity touch sensing function according to a second embodiment of the present invention.

Figure 10A:
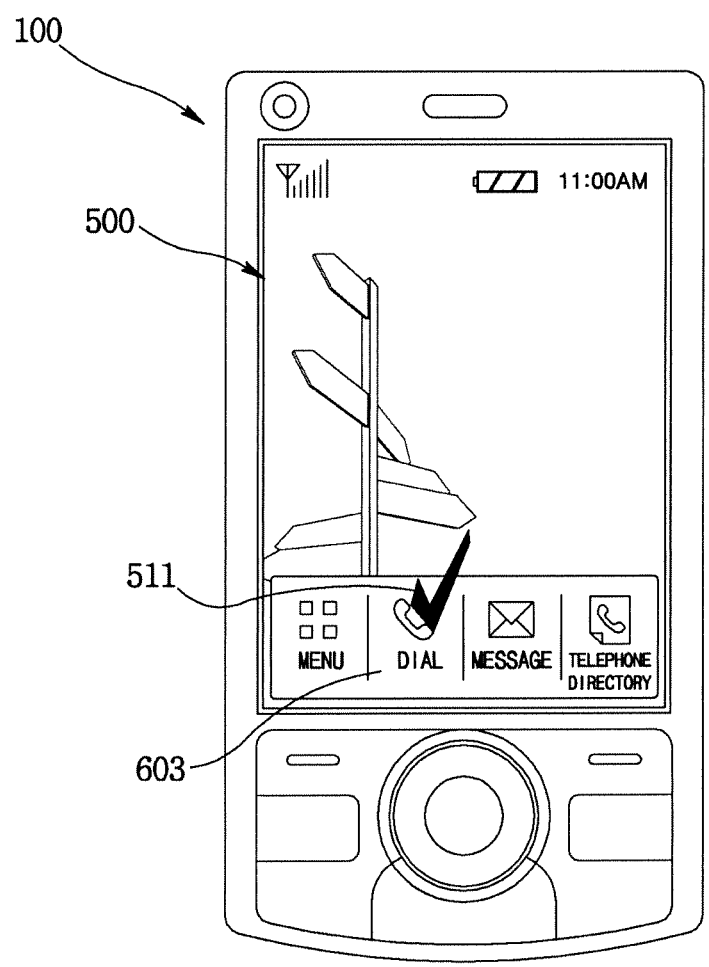
FIGS. 10a to 10d are schematic drawings illustrating a method for providing a graphic user interface using a mobile terminal capable of sensing a proximity touch sensing function according to an embodiment of the present invention.
Figure 10B:
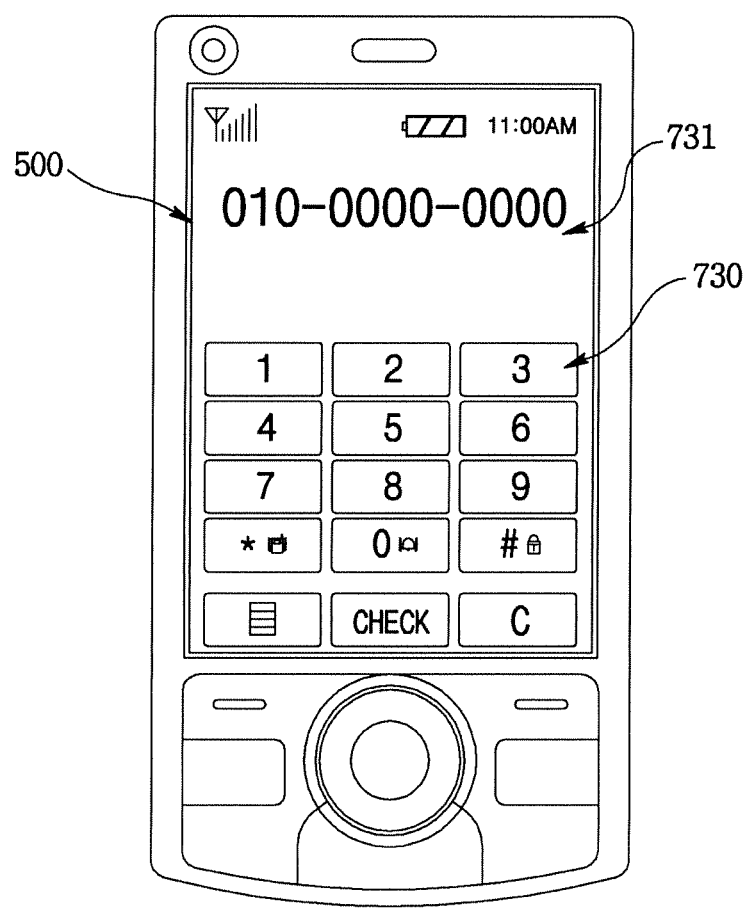

As illustrated in FIG. 10a, a check mark 511 defines a touch of a dial execution icon 603 via an input medium. Accordingly, as illustrated in FIG. 10b, the controller 180 may determine the touch of the dial execution icon 603 via an input medium and may display a dial 730 which may include number icons. Thus, the user may input telephone numbers by touching the number icons displayed on the dial 730, additionally, the touch screen 500 may display the telephone numbers input by the user on an upper area 731 of the dial 730.

The dial execution icon 603 of FIG. 10a corresponds to a first level menu. Furthermore, the dial 730 displayed on the touch screen 500 corresponds to a second level menu associated with the dial execution icon 603 as illustrated in FIG. 10b.

Figure 10C:
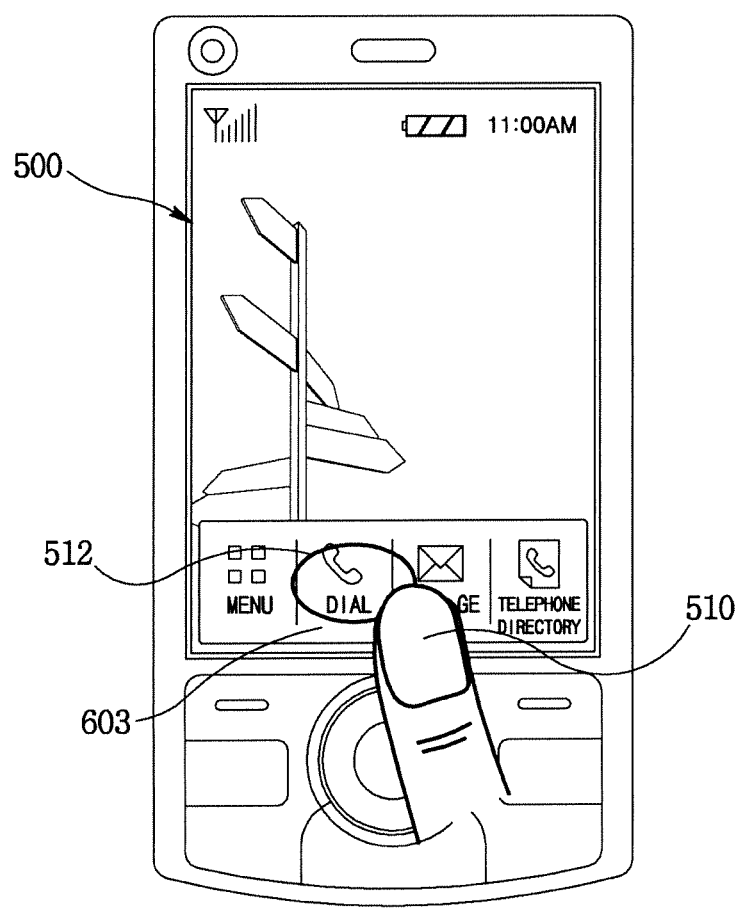

FIG. 10c illustrates a graphical user interface provided to a touch screen according to another embodiment of the present invention.

A selection marker 512 in FIG. 10c represents a proximity touch of the dial execution icon 603 displayed on the touch screen 500 by an input medium 510 within a touch identification distance of the touch screen 500.

Figure 10D:
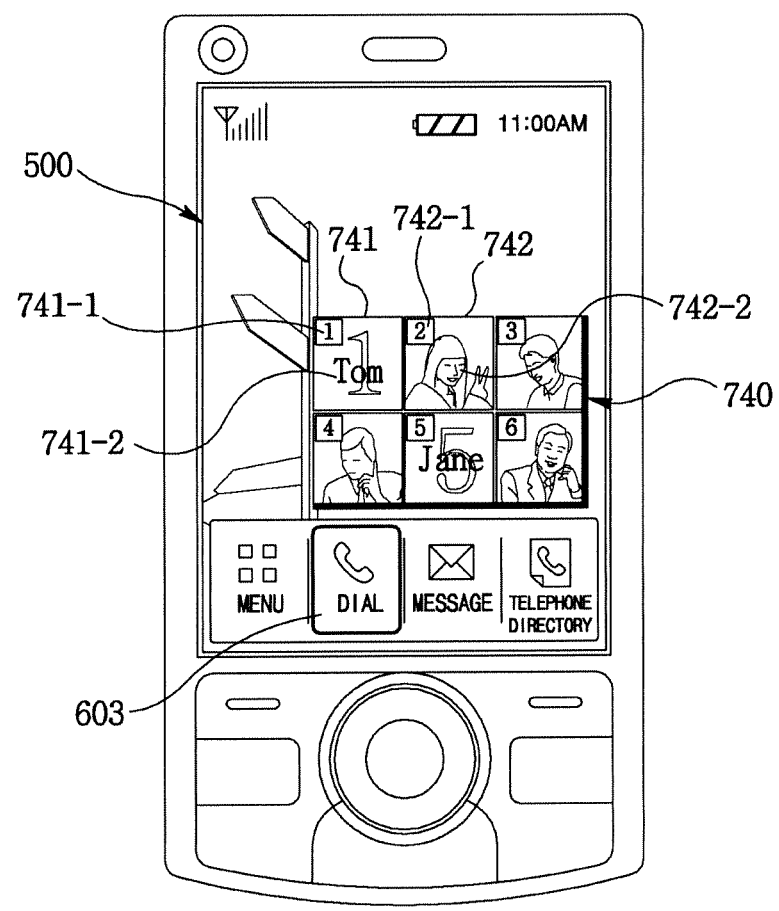

As illustrated in FIG. 10d, the controller 180 may determine that a proximity touch operation has been executed on the dial execution icon 603 for a predetermined period of time via an input medium 510. Accordingly, the controller 180 may display a second level menu for providing functions associated with the dial execution icon 603 on the touch screen 500 in response to the proximity touch.

The second level menu may include a speed dial number list 740 that may be used for telephone calling. A telephone number may be registered on the speed dial number list 740 by the user from the telephone numbers stored in the mobile terminal 100.

Referring to FIG. 10d, the speed dial number list 740 may include a series of photographs or a combination of photographs and characters. For example, a first object 741 may display the speed dial number, "1" 741-1, and a name registered to the speed dial number, "Tom" 741-2. A second object 742 in the speed dial number list 740 may include a speed dial number, "2" 742-1, and a photograph 742-2 registered with the speed dial number. Thus, the user may select a party to dial by selecting a name or a photograph in the displayed speed dial number list 740.

The dial execution icon 603 corresponds to a first level menu, and the speed dial number list 740 displayed on the touch screen 500 via proximity touch of the dial execution icon 603 corresponds to a second level menu 720 associated with the dial execution icon 603.

While the speed dial number list 740 is displayed on the touch screen 500 an input medium 510 may select an icon, such as the first object 741, via a direct touch. The controller 180 may determine the direct touch operation and execute the telephone connection function to a telephone number associated with the first object 741. Thus, the user may use the dial execution icon 603 displayed on the waiting screen to select a party for telephone communication without retrieving the multi-staged menu tree of the mobile terminal 100.

Furthermore, as illustrated in FIG. 10d, while the speed dial number list 740 is displayed on the touch screen 500, the controller 180 may display the screen illustrated in FIG. 10c on the touch screen 500 if the input medium 510 deviates from the touch identification distance of the touch screen 500.

Although FIG. 10d has illustrated an example of the speed dial number list 740 as a second level menu of the dial execution icon 603, the second level menu may be a most recent communication sequence list or a most frequent communication sequence list. The most recent communication sequence list may include a recently dialed list and a recently received list or a combination thereof. The most frequent communication sequence list may include a most frequently dialed list and a most frequently received list or a combination thereof.

FIGS. 11a to 11d are schematic drawings illustrating a method for providing a graphic user interface using a mobile terminal capable of sensing a proximity touch sensing function according to another embodiment of the present invention.

Figure 11A:
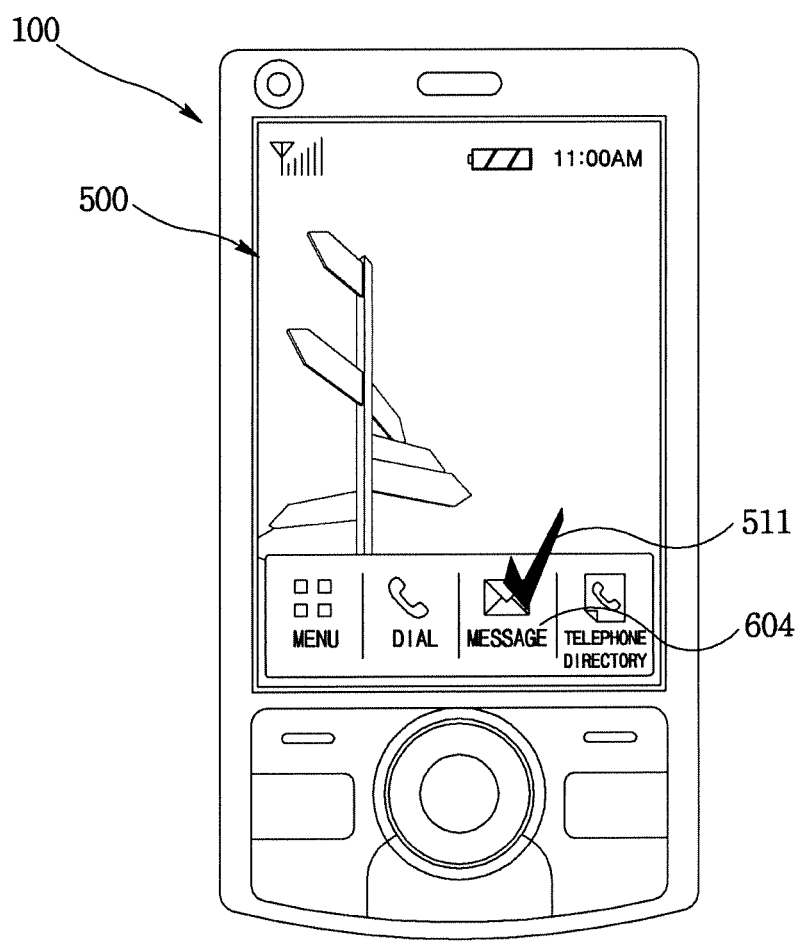
FIGS. 11a to 11d are schematic drawings illustrating a method for providing a graphic user interface using a mobile terminal capable of sensing a proximity touch sensing function according to an embodiment of the present invention.

As illustrated in FIG. 11a, a check mark 511 may define a direct touch of a message execution icon 604 via an input medium.

Figure 11B:
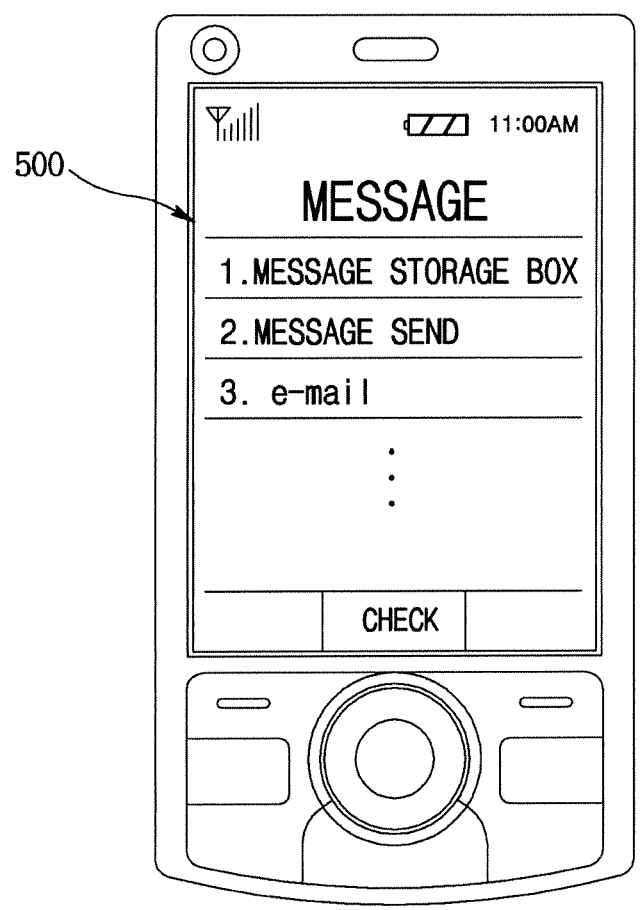

As illustrated in FIG. 11b, the controller 180 may determine if a direct touch operation has been executed on the message execution icon 604 and may display a list comprising a series of text objects including "1.message storage box" for storing transmission/reception messages, "2.message send" for preparing and transmitting a message and "3. e-mail" for preparing/storing and transmitting/receiving e-mails. A user may select any one text object via a direct touch in order to execute a function associated with the text object.

The message execution icon 604 of FIG. 11a corresponds to a first level menu and the text objects displayed on the touch screen 500 correspond to second level menus associated with the message execution icon 604.

Figure 11C:
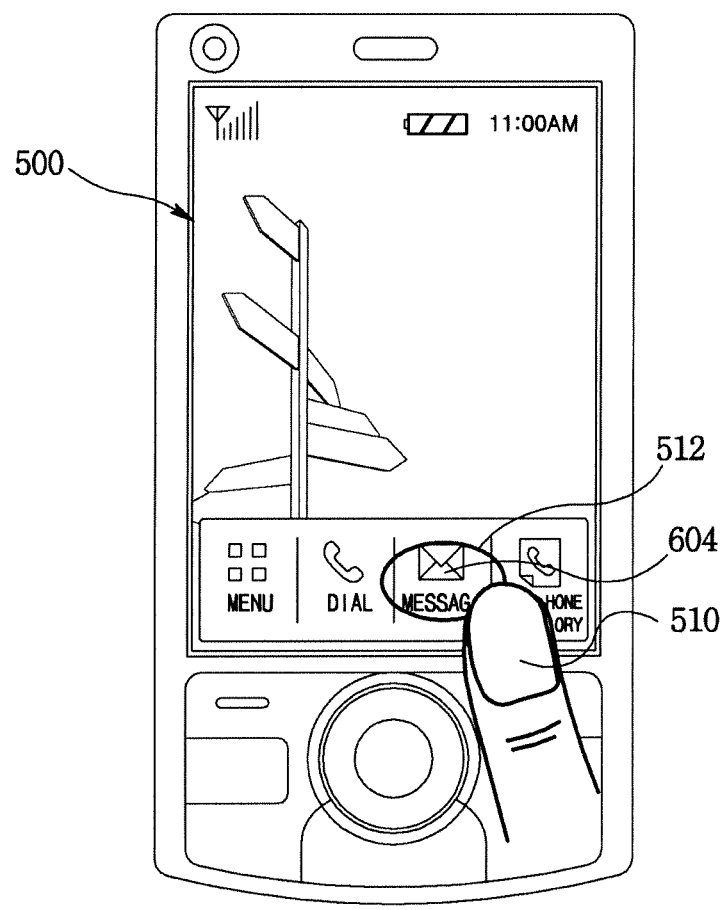

FIG. 11c illustrates a graphic user interface provided to the touch screen during proximity touch operation of the input medium according to another embodiment of the present invention.

A selection marker 512, as illustrated in FIG. 11c, defines a proximity touch via the input medium 510 to the message execution icon 604 displayed on the touch screen 500 within the touch identification distance of the touch screen 500.

The controller 180 determines the proximity touch operation on the message execution icon 604 via the input medium 510 for a predetermined period of time and displays a second level menu for providing a function associated with the message execution icon 604 on the touch screen 500.

The second level menu may be a most frequently sent list 750 that lists names and telephone numbers of opposite parties in a sequence of messages most frequently sent via the mobile terminal 100.

Figure 11D:
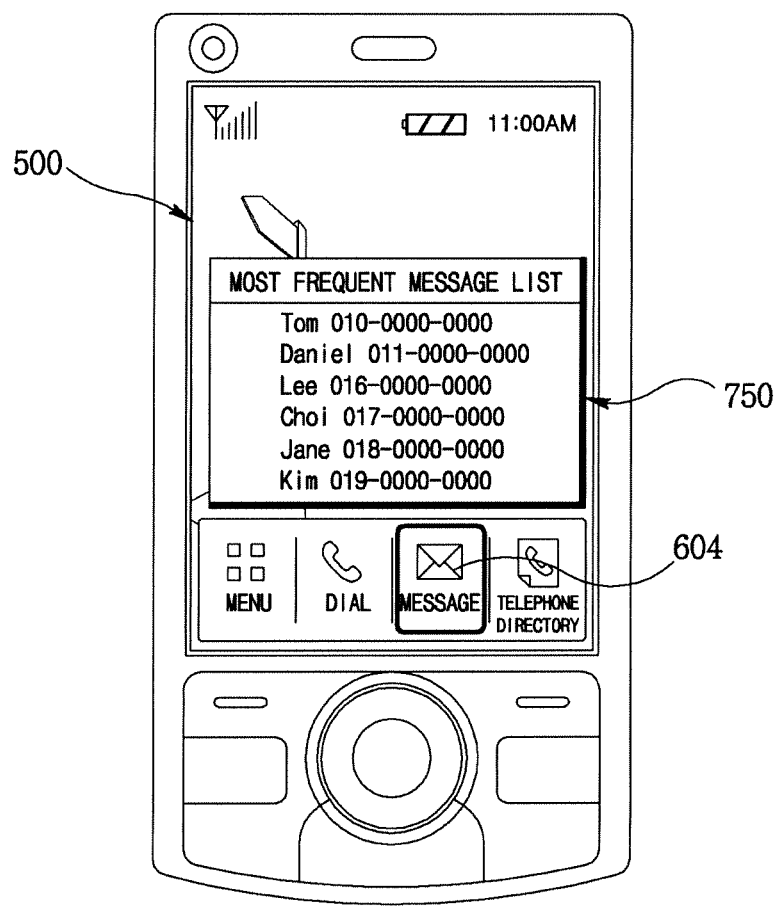

The most frequently sent list 750 of FIG. 11d may include text objects combined with names and telephone numbers of recipients. For example, a first name, "Tom", displayed on the most frequently sent list 750 represents a person who has most frequently received messages via the mobile terminal 100 during a predetermined period of time, such as a day or a week. The other names, "Daniel" to "Kim", displayed below the first name represent individuals who have most frequently received messages according to an arranged order from an upper direction to a lower direction. Thus, the user may easily select a party to communicate with by looking up the names and telephone numbers on the displayed most frequently sent list 750.

The message execution icon 604 corresponds to a first level menu, and the most frequently sent list 750 displayed on the touch screen 500 according to the proximity touch of the message execution icon 604 corresponds a second level menu associated with the message execution icon 604.

Thus, a function of transmitting a message to a telephone number, "010-000-0000", allocated to the first name, "Tom", may be instantly executed if the input medium 510 directly touches the first name on the most frequently sent list 750. As a result, a user may instantly send a message to a party without cumbersomely retrieving the multi-staged menu tree constructed in the mobile terminal 100.

Furthermore, the controller 180 may display the former screen illustrated in FIG. 11c on the touch screen 500 if the input medium 510 deviates from the touch identification distance of the touch screen 500 without touching a name included in the most frequently sent list 750.

Although FIG. 11d has illustrated an example of the most frequently sent list 750 as a second level menu of the dial execution icon 603, the second level menu may be constructed in a most recently sent sequence list or a speed dial number list.

FIGS. 12a to 12d are schematic drawings illustrating a method for providing a graphic user interface using a mobile terminal capable of sensing a proximity touch sensing function according to another embodiment of the present invention.

Figure 12A:
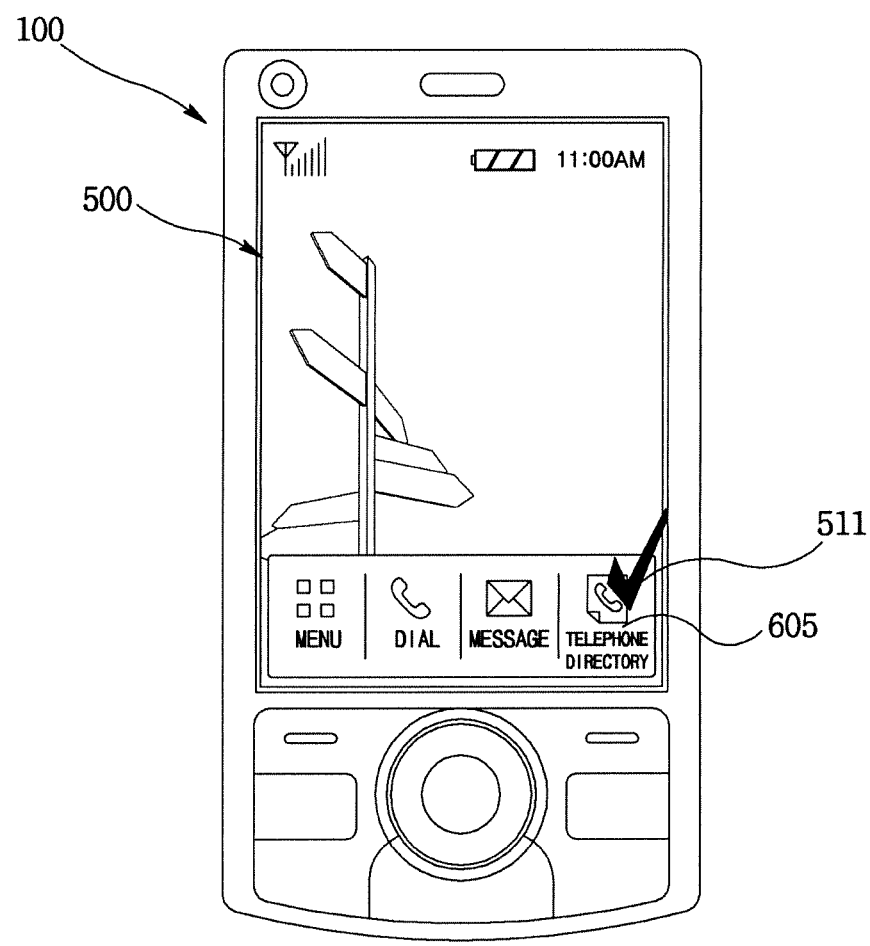
FIGS. 12a to 12d are schematic drawings illustrating a method for providing a graphic user interface using a mobile terminal capable of sensing a proximity touch sensing function according to an embodiment of the present invention.
Figure 12B:
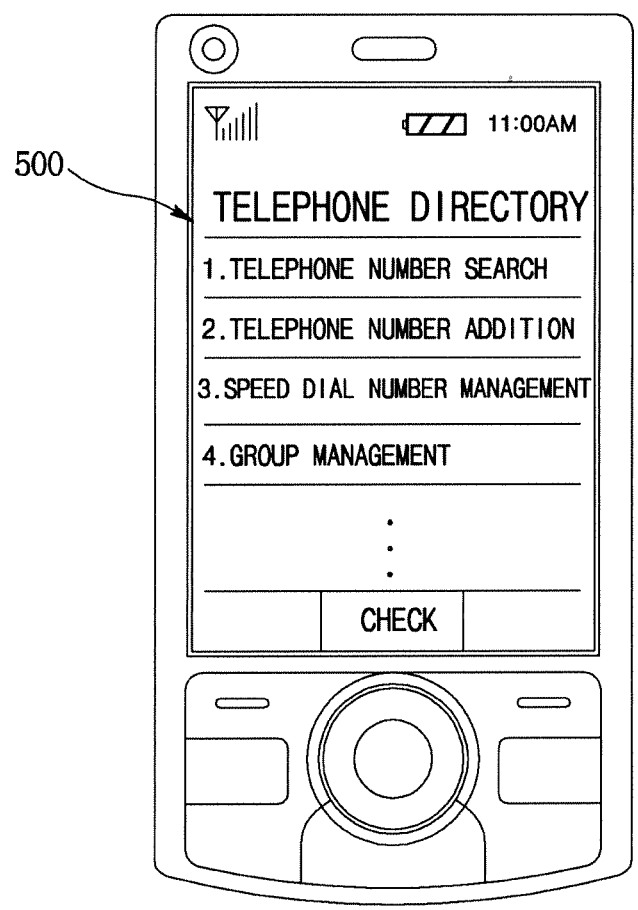

As illustrated in FIG. 12a, a check mark 511 defines a direct touch of a telephone directory execution icon 605 via an input medium. The controller 180 determines the direct touch operation and may displays a list comprising a series of text objects including "1.telephone number search seek", "2. telephone number addition", "3.speed dial number management", and "4.group management". Thus, a user may seek a desired telephone number by selecting any one of the displayed text objects.

The telephone directory execution icon 605 corresponds to a first level menu and the text objects displayed on the touch screen 500 correspond to a second level menu associated with the telephone directory execution icon 605.

Figure 12C:
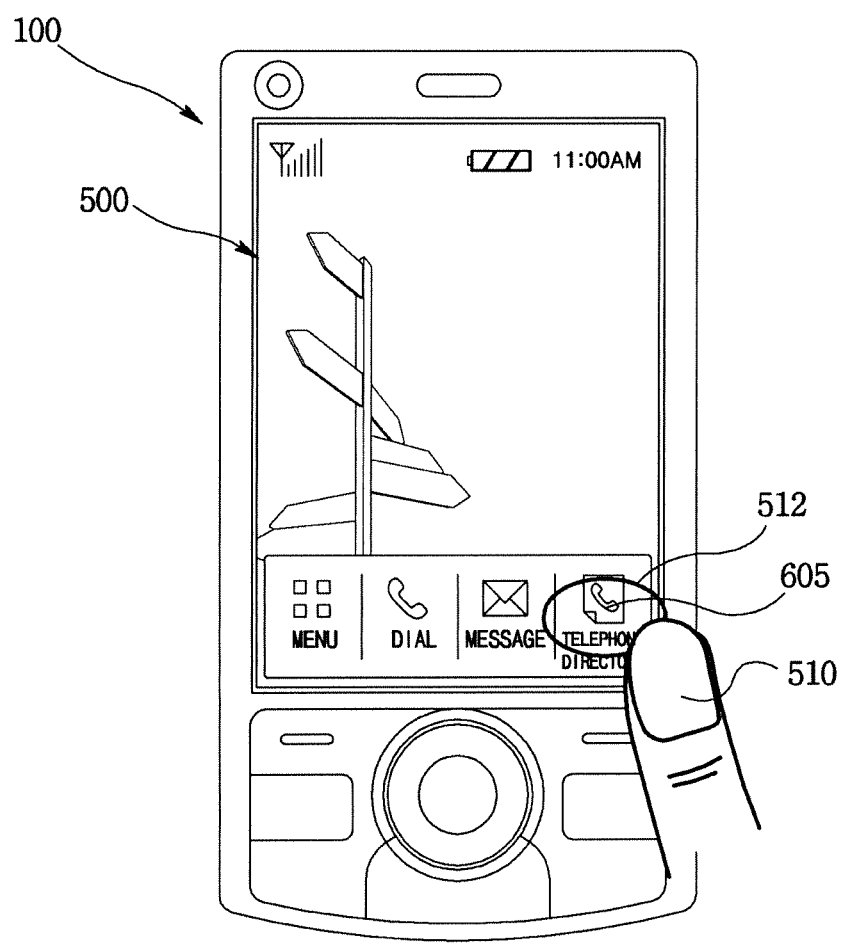

FIG. 12c illustrates a graphic user interface provided to a touch screen during proximity touch operation of an input medium according to another embodiment of the present invention.

A selection marker 512 of FIG. 12c defines an area where an input medium 510 has proximity-touched the telephone directory execution icon 605 displayed on the touch screen 500 within a touch identification distance of the touch screen 500. The controller 180 determines that the input medium 510 has performed the proximity touch operation for a predetermined period of time and may display on the touch screen 500 a second level menu for providing a function associated with the telephone directory execution icon 605, as illustrated in FIG. 12d.

The second level menu includes a group classification list 760 for retrieving an entire telephone directory or a group telephone directory stored in the mobile terminal 100. Additionally, as shown in FIG. 12d, the group classification list 760 may include a series of text objects. For example, the group classification list 760 may include an "entire" text object 761 for retrieving all telephone numbers, and a "family" text object 762 for retrieving telephone numbers of people registered by the user as family. Furthermore, the group classification list 760 may include text objects 763-766 for retrieving telephone numbers of people registered by the user as friends, co-workers, church, or organization. Thus, the user may display the displayed group classification list 760 using the input medium 510 and select a desired group from the text objects 761-766 in order to instantly display a telephone directory corresponding to the desired group.

The controller 180 may determine a direct touch operation on a text object 761-766 in order to instantly display a telephone directory corresponding to a respective text object. For example, if the "family" text object 761 is selected via a direct touch, the controller 180 may display a telephone directory corresponding to the "family" text object 761.

Figure 12D:
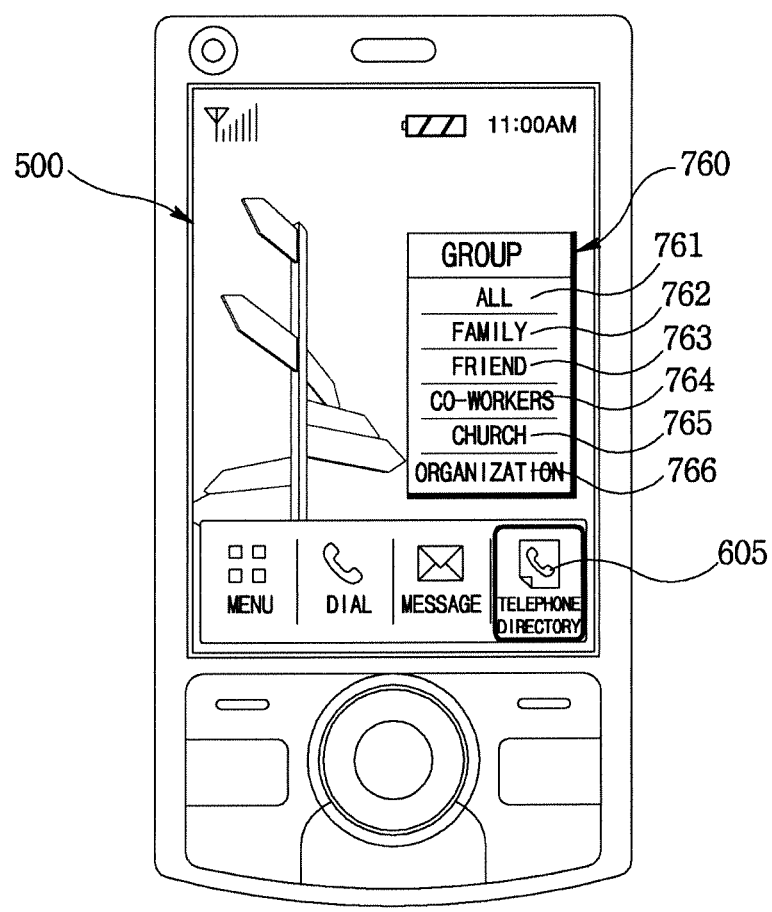

Furthermore, as illustrated in FIG. 12d, the controller 180 may display the former screen illustrated in FIG. 12c on the touch screen 500 if the input medium 510 deviates from the touch identification distance of the touch screen 500 without touching any one group object 761-766 included in the group classification list 760.

FIGS. 13a to 13d are schematic drawings illustrating a method for providing a graphic user interface using a mobile terminal capable of sensing a proximity touch sensing function according to another embodiment of the present invention.

Figure 13A:
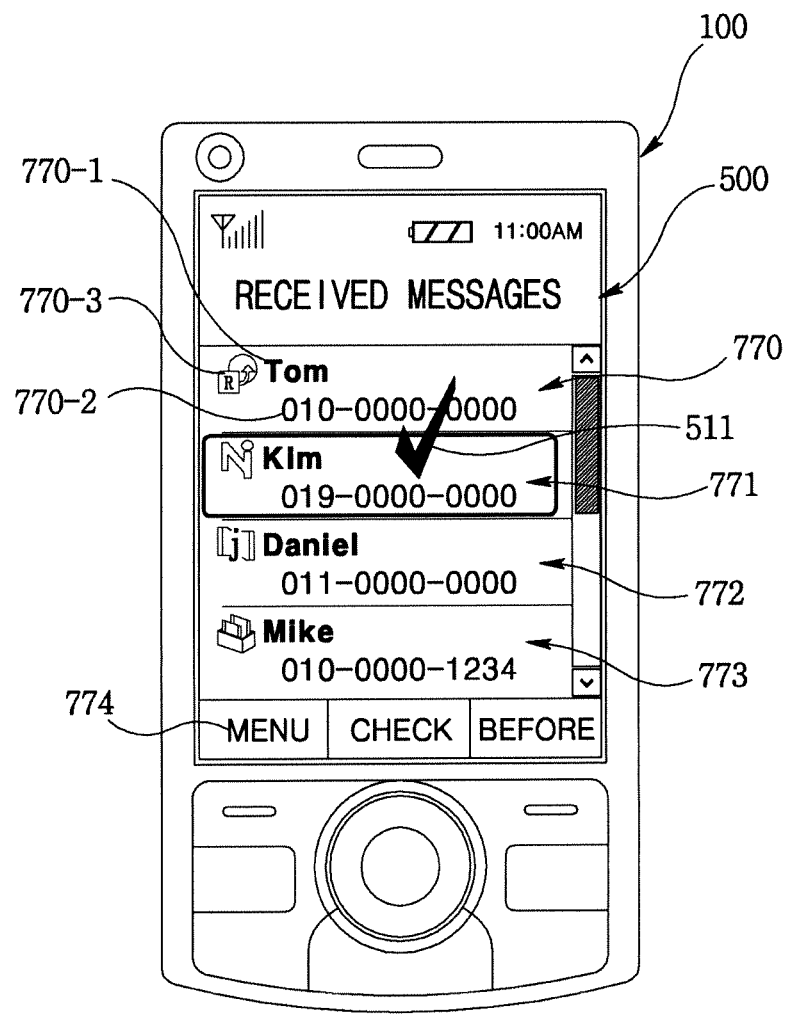
FIGS. 13a to 13d are schematic drawings illustrating a method for providing a graphic user interface using a mobile terminal capable of sensing a proximity touch sensing function according to an embodiment of the present invention.

FIG. 13a illustrates a graphic user interface provided to a touch screen during a direct touch operation of an input medium where a received messages box is displayed on the touch screen.

The "received messages" window illustrated in FIG. 13a is associated with the "1.message storage" from the second level menus illustrated in FIG. 8. The "received message" window displays a list of people who have sent messages to the mobile terminal 100. The list includes received message objects 770-773 indicating information regarding the users which have sent messages to the mobile terminal 100. For example, a received message object 770 may include a combination of a name 770-1, a telephone number 770-2, and an icon 770-3.

Figure 13B:
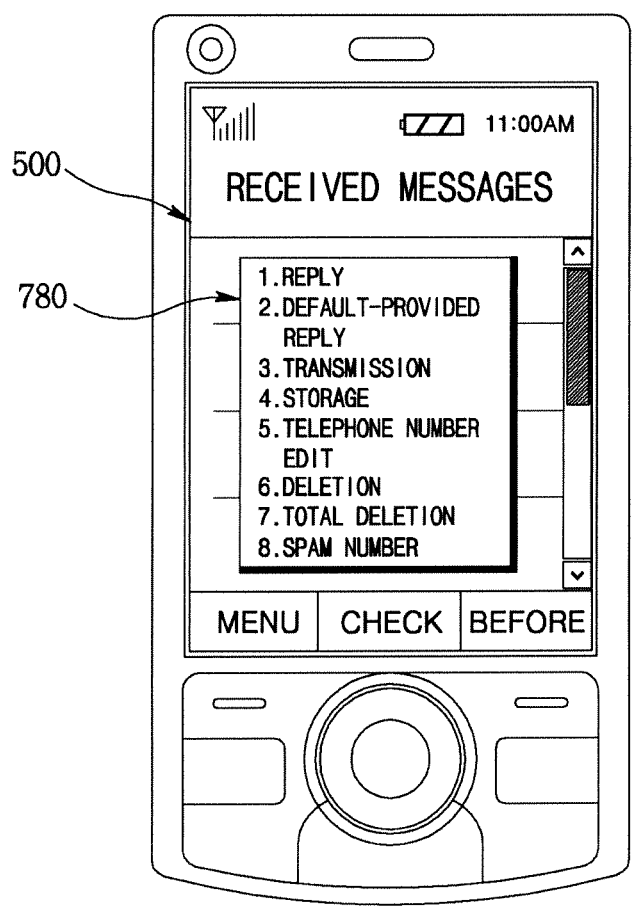

A check mark 511 illustrated in FIG. 13a defines a direct touch of a received message object 771 via an input medium. For example, the controller 180 may determine the direct touch operation on the received message object 771 and may display a list 780 for providing a function associated with the received message object 771, as illustrated in FIG. 13b.

The list 780 may include a series of text objects such as "1.reply" for sending a text message to a telephone number included in the received message object 771, "2.default-provided reply" for sending pre-stored and frequently-used phrases, such as "Who are you?" or "reply later", "3.forward" for forwarding the received message included in the received message object 771, "4. storage" for storing the received message included in the received message object 771 to a predetermined storage space of the mobile terminal 100, "5.telephone number edit" for editing telephone numbers included in the received message object 711, "6.deletion" for deleting the received message object 711, "7.total deletion" for deleting all received message objects 770-773 stored in the received messages box, and "8.spam number registration" for registering the received message object 771 as a spam number and managing the spam number list. Thus, the user may direct touch any text object to perform a function corresponding to the text object selected by the mobile terminal 100.

The received message object 771 illustrated in FIG. 13a corresponds to a first level menu and the list 780 displayed on the touch screen 500 corresponds to a second level menu associated with the received message object 771.

Thus, the input medium may direct touch a first level menu displayed on the touch screen 500 to allow a second level menu corresponding to the first level menu to be displayed on the touch screen 500.

Additionally, the controller 180 may determine the direct touch operation on a first level menu in order to execute a function associated with the first level menu displayed on the touch screen 500. For example, the received message associated with the received message object 771 may be displayed on the touch screen 500 if the input medium direct touches the second object 771.

Additionally, the list 780 may be displayed on the touch screen 500 as illustrated in FIG. 13b, or the received message object 771 may be displayed on the touch screen 500, if the input medium direct touches a menu icon 774.

FIG. 3c illustrates a graphic user interface provided to a touch screen during a proximity touch operation via an input medium according to another embodiment of the present invention.

A selection marker 512 defines that an input medium 510 is in close proximity of the received message object 771 displayed on the touch screen 500 within a touch identification distance of the touch screen 500. Thus, the controller 180 may determine the proximity touch operation on the received message object 771 and may display a second level menu for providing a partial list of functions frequently used by the user from the list of all functions associated with the second object 771, as illustrated in FIG. 13d.

The second level menu may be a hot list 790 including objects such as "1.reply" 791, "2.default-prepared reply" 792, and "3.delete" 793. Thus, the user may use the input medium 510 to select and execute a function corresponding to the objects 791-793 included in the hot list 790.

The received message object 771 corresponds to a first level menu, and the hot list 790 displayed on the touch screen 500 corresponds to a second level menu associated with the second object 771.

The controller 180 determines the direct touch operation of an object displayed on the second level menu and may execute a function associated with the selected object. For example, if the input medium 510 directly touches the "3.delete" object 793, the controller determines the direct touch operation and deletes the received message object 771 associated with the "3.delete" text object 793.

Thus, the user may execute a desired function on a mobile terminal 100 by displaying a second level menu for performing a frequently-used function of a plurality of functions without retrieving a multi-staged menu tree.

Figure 13C:
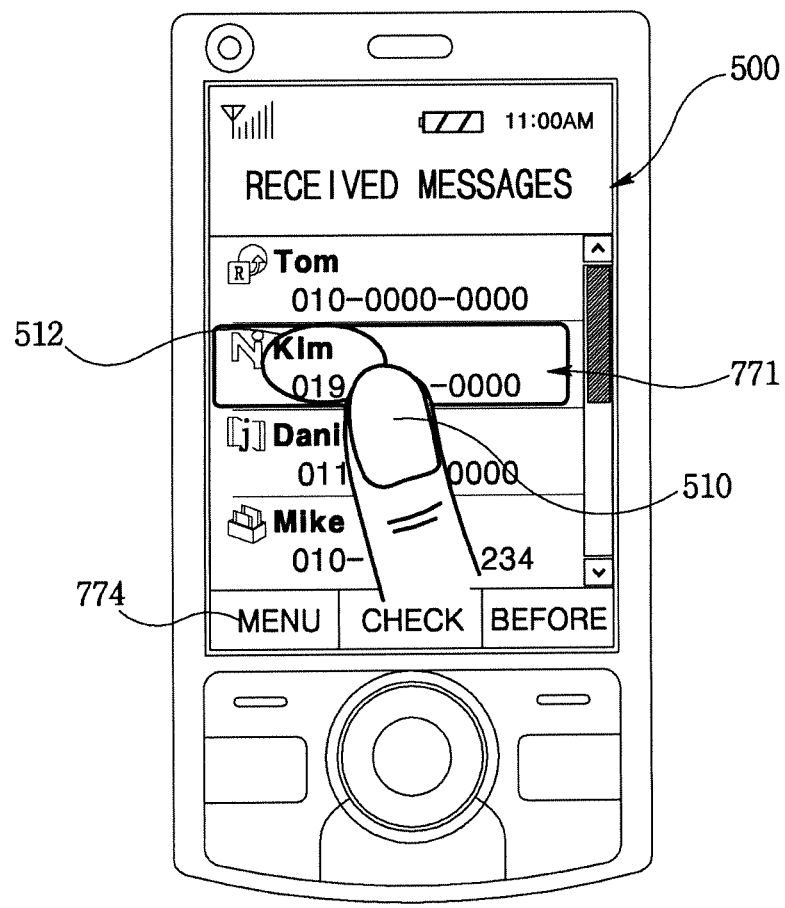
Figure 13D:
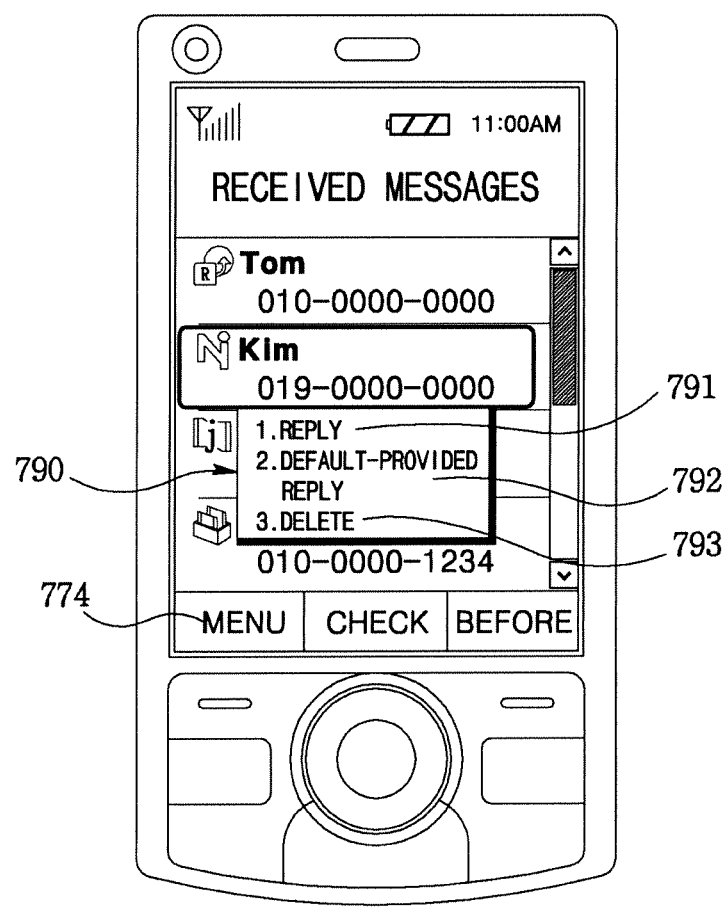

Furthermore, the controller 180 may again display the screen illustrated in FIG. 13*c* on the touch screen 500 if the input medium 510 deviates from the touch identification distance of the touch screen 500 without directly touching any one text object of the text objects 791-793. Additionally, the hot list 790 may be displayed on the touch screen 500 as illustrated in FIG. 13*d*, if the input medium 510 is in proximity of a menu icon 774 displayed on the touch screen 500.

FIGS. 14*a* to 14*d* illustrate a method for providing a graphic user interface using a mobile terminal capable of sensing a proximity touch function according to another embodiment of the present invention.

Figure 14A:
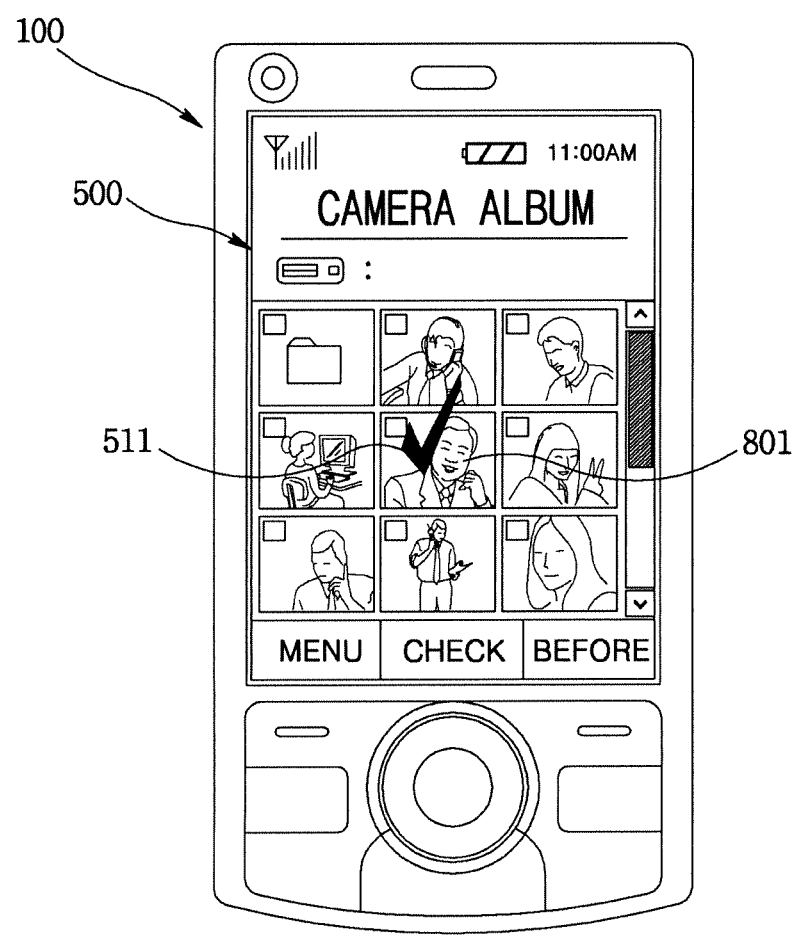
FIGS. 14a to 14d are schematic drawings illustrating a method for providing a graphic user interface using a mobile terminal capable of sensing a proximity touch sensing function according to an embodiment of the present invention.

FIG. 14*a* illustrates a graphic user interface provided to a touch screen during a direct touch operation by an input medium when a camera album is displayed on the touch screen according to another embodiment of the present invention.

The "camera album" illustrated in FIG. 14*a* is associated with the "1.camera" second level menu illustrated in FIG. 8. Furthermore, as illustrated in FIG. 14*a*, the "camera album" is displayed with a plurality of photo objects stored in the mobile terminal 100.

Figure 14B:
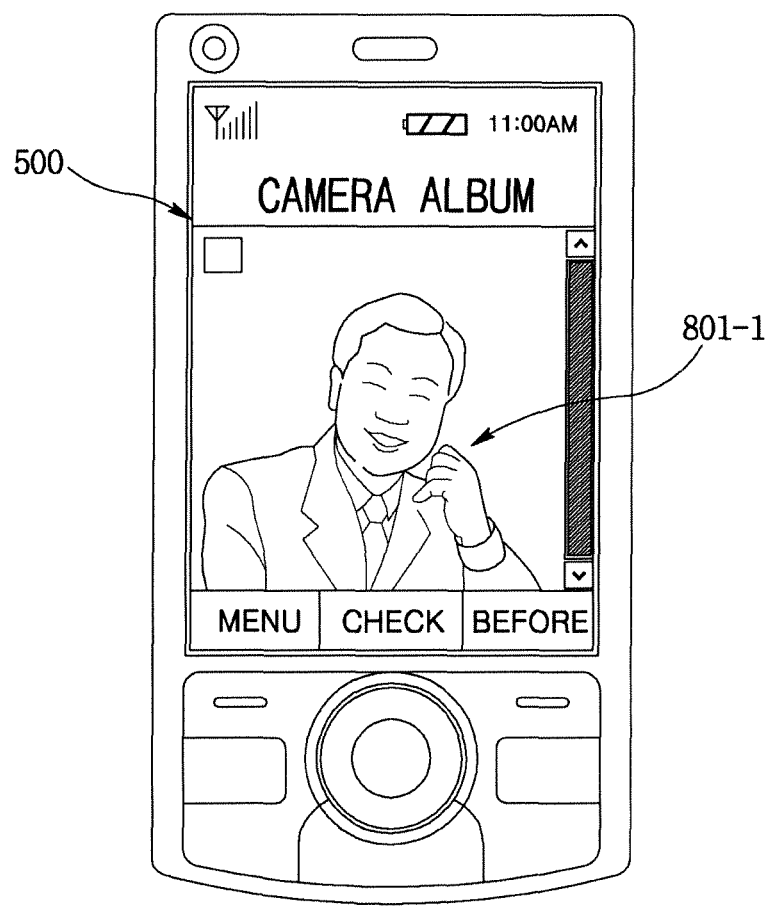

A check mark 511 illustrated in FIG. 14*a* defines a direct touch of a photo object 801 via an input medium. The controller 180 may determine the direct touch of the photo object 801 and display the photo object 801-1 on the touch screen 500 in an enlarged format, as illustrated in FIG. 14*b*.

Figure 14C:
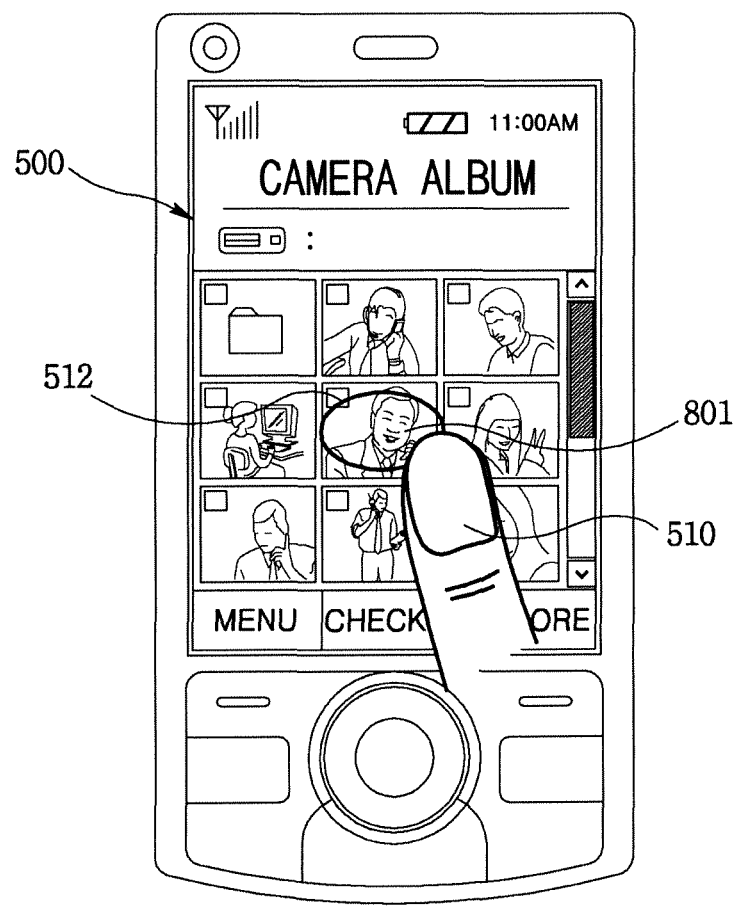

FIG. 14*c* illustrates a graphic user interface provided to the touch screen during proximity touch operation via an input medium according to another embodiment of the present invention.

A selection marker 512 of FIG. 14*c* defines an area where an input medium has proximately touched a photo object 801 displayed on the touch screen 500 within a touch identification distance of the touch screen 500.

Figure 14D:
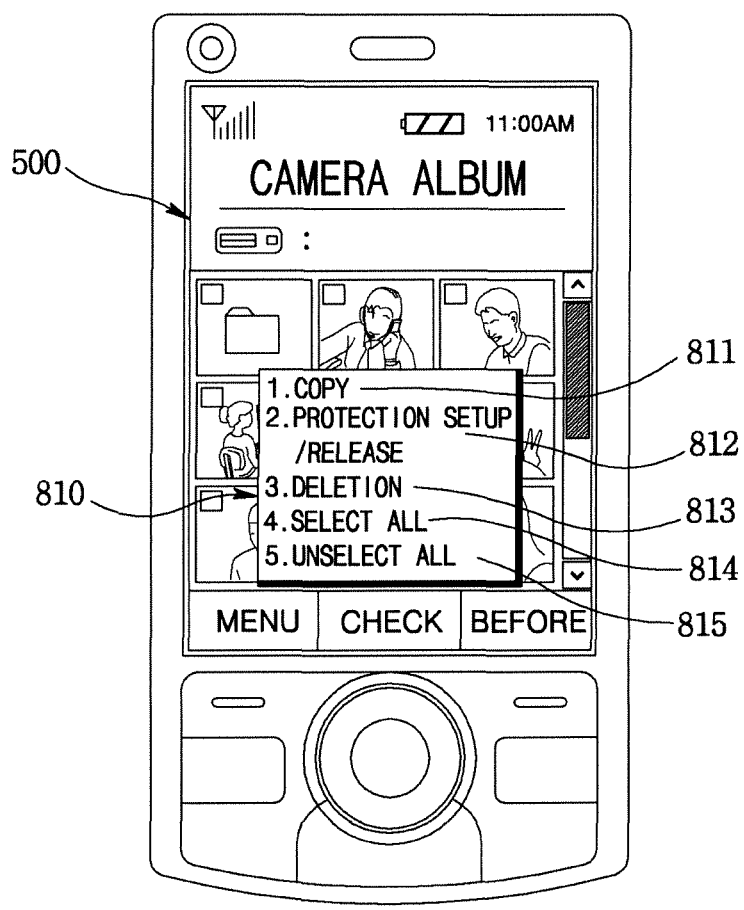

Thus, the controller 180 determines the proximity touch operation on the photo object 901 and may display a second level menu for providing a partial list of frequently used functions as illustrated in FIG. 14*d*.

As illustrated in FIG. 14*d*, the second level menu may be a list 810 including text objects 811 to 815, such as. "1.copy" 811 for copying the photo object 801, "2.protection setup/release" 812 for protecting the photo object from deletion or releasing the protection of the photo object, "3.deletion" 813 for deleting the photo object 801, "4.select all" 814 for selecting all photo objects currently displayed on the touch screen 500, and "5.unselect all" 815 for unselecting all the photo objects currently displayed on the touch screen 500.

Thus, the user may select and execute the frequently-used functions corresponding to the text objects 811-815 included in the list 810 by using the input medium 510. For example, the controller 180 may determine the direct touch operation on the "3.deletion" text object 813 and delete the photo object 801 by executing a function corresponding to the "3.deletion" text object 813. The thumbnail-shaped photo object 801 illustrated in FIG. 14*c* corresponds to a first level menu, and the list 810 corresponds to a second level menu associated with the photo object 801.

Furthermore, as illustrated in FIG. 14*d*, the controller 180 may display the screen illustrated in FIG. 14*c* on the touch screen 500, if the input medium 510 deviates from the touch identification distance of the touch screen 500 without direct touching any one text object of the text objects 811-815 displayed on the touch screen 500.

FIGS. 15*a* to 15*d* are schematic drawings illustrating a method for providing a graphic user interface using a mobile terminal capable of sensing a proximity touch sensing function according to another embodiment of the present invention.

Figure 15A:
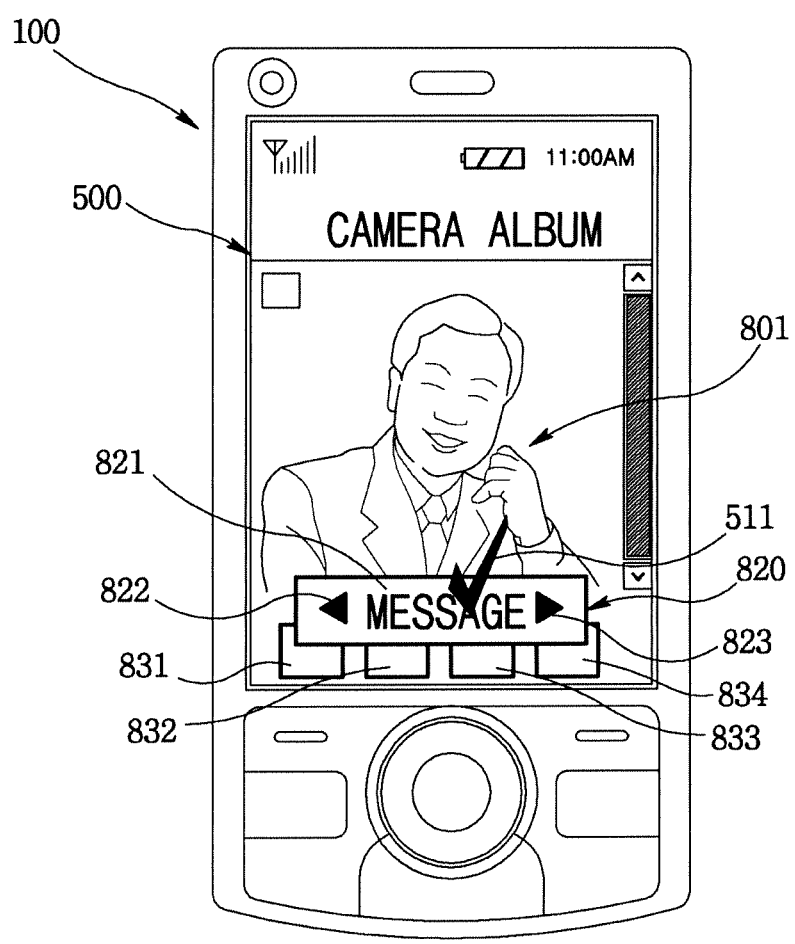
FIGS. 15a to 15d are schematic drawings illustrating a method for providing a graphic user interface using a mobile terminal capable of sensing a proximity touch sensing function according to an embodiment of the present invention.

FIG. 15*a* illustrates a graphic user interface provided to a touch screen during a direct touch operation by an input medium in a situation where the camera album is displayed on the touch screen according to another embodiment of the present invention.

As illustrated in FIG. 15*a*, the mobile terminal 100 may multitask and display objects 820-834 for using functions on the touch screen 500 without terminating the currently-used function, such as the "camera album" function.

Referring to FIG. 15*a*, the controller 180 may determine a user command and display a first level menu object 820 for retrieving the first level menus 710-718 and second level menu objects 831-834 for instantly executing a partial list of second level menus if the user manipulates the manipulation unit 130 to input the user command for executing the multitasking service while mobile terminal 100 is executing a function, such as the "camera album" function.

Figure 15B:
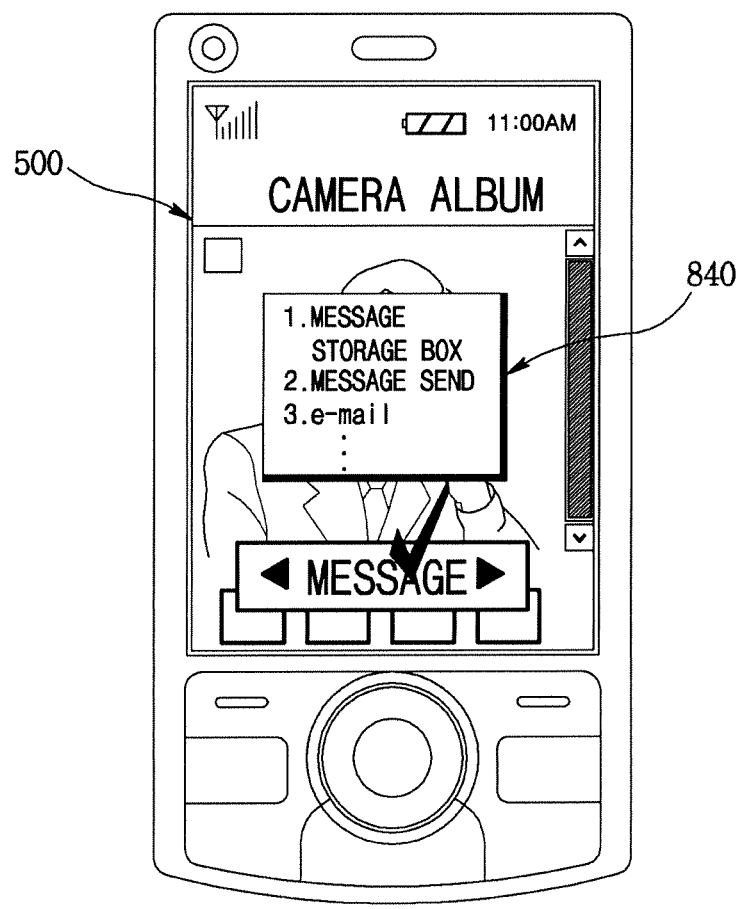

A check mark 511 of FIG. 15*a* refers to a direct touch via the input medium on a "message" text object 821 in the first level menu object 820. Thus, as illustrated in FIG. 15*b*, the controller 180 may determine the direct touch operation and display a list 840 including text objects such as "1.message storage box," ".2.message send," and "3.e-mail," for executing a second level menu function of the "message" text object 821, if the input medium direct touches the "message" text object 821. Additionally, each of the text objects such as "1.message storage box," "2.message send," and "3.e-mail" may also include a plurality of third level menus. For example, the "1.message storage box" may be formed with third level menus such as "received message folder" for storing messages received by the mobile terminal 100, "permanent storage box" for storing messages to be permanently stored by the user, and "spam message" for managing the received message designated as a spam message.

Furthermore, first level menus 710-718 may be sequentially retrieved in the menu tree structure if the input medium direct touches the menu movement icons 822, 823. For example, the controller 180 may determine the direct touch of the menu movement icon 822 and may display a "diary" text object on the first level menu 820.

Figure 15C:
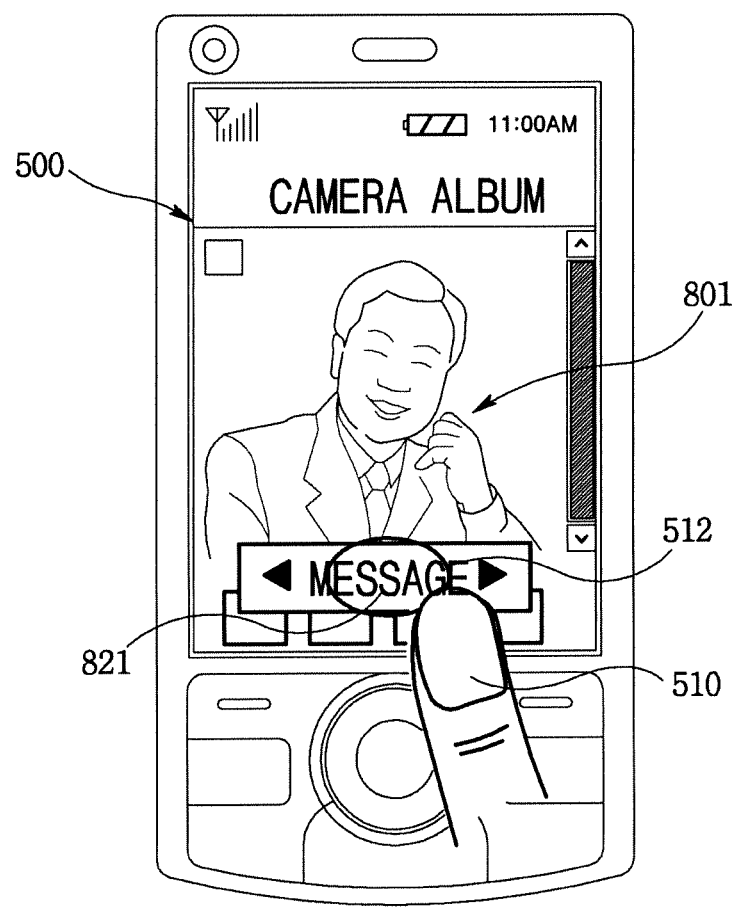

FIG. 15*c* illustrates a graphic user interface provided to a touch screen during a proximity touch operation of an input medium according to another embodiment of the present invention.

A selection marker 512 in FIG. 15*c* defines an area where an input medium 510 proximity touches the "message" text object 821 within a touch identification distance of the touch screen 500.

Figure 15D:
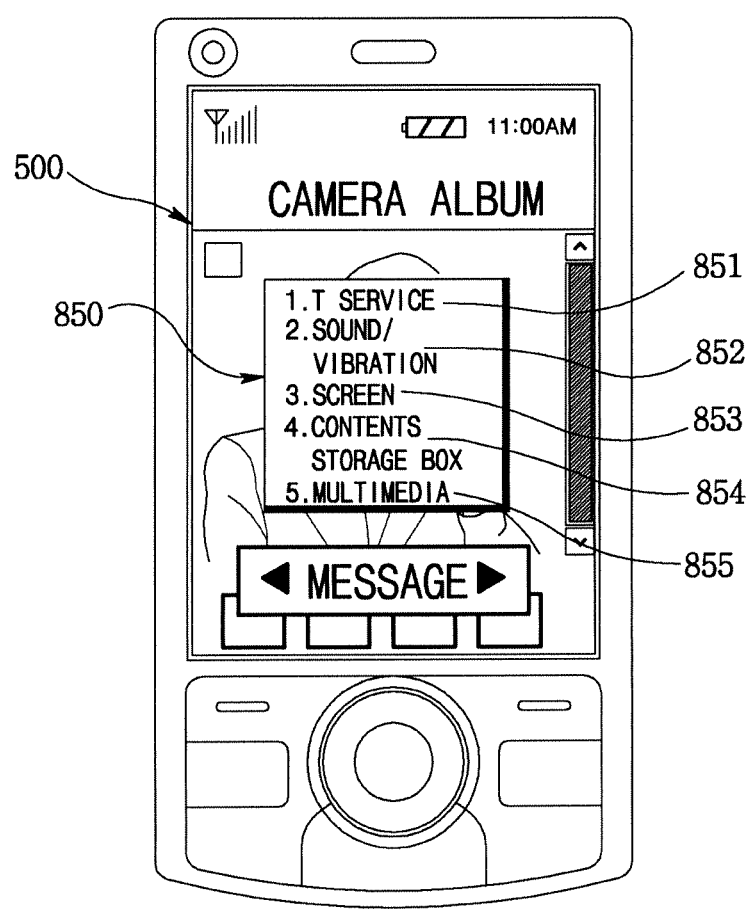

Thus, as illustrated in FIG. 15*d*, the controller 180 determines the proximity touch operation has been performed for a predetermined time and may display a second level menu for providing a full or partial list of the first level menus 710-718 frequently used by a user on the touch screen 500.

The second level menu, as illustrated in FIG. 15d, may be a list 850 of text objects 851-855 including the "1.T service" 851, "2.sound/vibration" 852, "3.screen" 853, "4.contents storage box" 854, and "5.multimedia" 855. Thus, the user may use the input medium 510 to select one of the text objects 851-855 included in the list 850 and execute the desired function.

The "message" text object 821 illustrated in FIG. 15c corresponds to an first level menu, and the list 850 displayed on the touch screen 500 corresponds to a second level menu associated with the "message" text object 821.

The controller 180 may determine the direct touch operation and display a second level menu corresponding to a displayed first level menu or perform a function related to the first level menu. For example, the controller 180 may determine the direct touch of the "1.Tservice" text object 851 and display a second level menu or execute a specific function, if the input medium 510 direct touches the "1.Tservice" text object 851.

Furthermore, as illustrated in FIG. 15d, the controller 180 may display on the touch screen 500 the screen illustrated in FIG. 15c, in case the input medium 510 deviates from the touch identification distance of the touch screen 500 without direct touching any object displayed on the touch screen 500.

FIGS. 16a to 16d are schematic drawings illustrating a method for providing a graphic user interface using a mobile terminal capable of sensing a proximity touch sensing function according to another embodiment of the present invention.

Figure 16A:
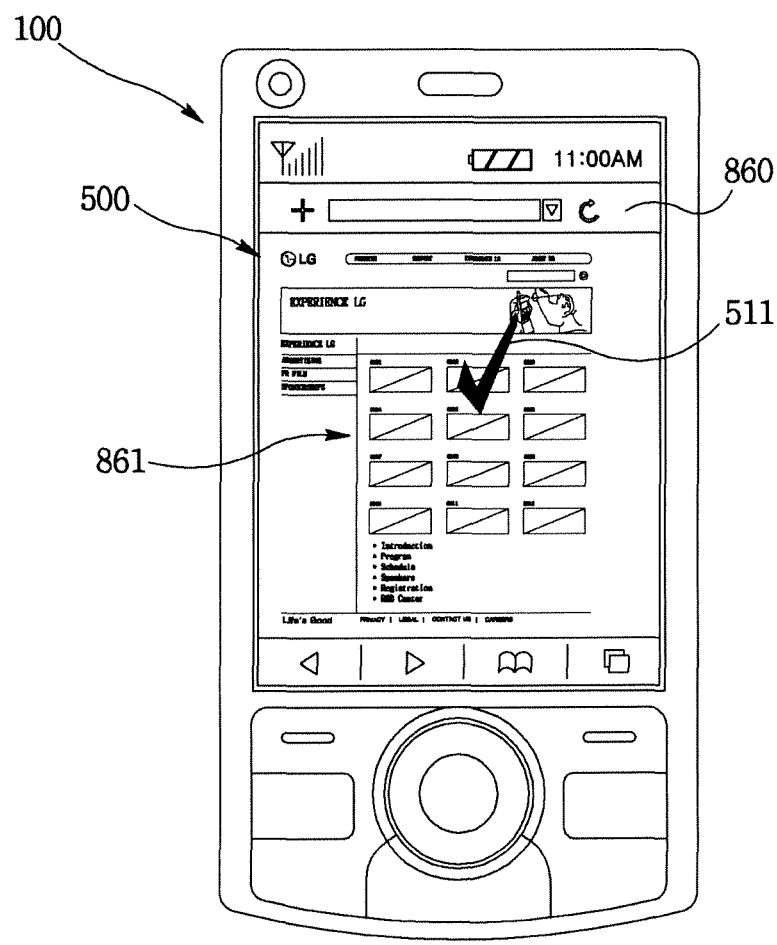
FIGS. 16a to 16d are schematic drawings illustrating a method for providing a graphic user interface using a mobile terminal capable of sensing a proximity touch sensing function according to an embodiment of the present invention.

FIG. 16a illustrates a graphic user interface provided to a touch screen during a direct touch operation of an input medium where a web page is displayed on the touch screen according to another embodiment of the present invention.

Referring to FIG. 16a, the mobile terminal 100 may be connected to the web site via a wireless Internet module 113, and a web page of the connected web site may be displayed on the touch screen 500. FIG. 16a illustrates an entire area of a single web page in web browser 860. The wireless Internet access function may be executed by "3.wireless Internet" menu of the "1.Tservice" 710 menu object.

The web page displayed on the mobile terminal 100 may be defined by a web page object, and the web page object may include a variety of objects such as corporate logo, menu bar, advertisement, image, text, and graphic. Furthermore, the corporate logo, the menu bar, the advertisement, the image, the text, and the graphic included in the web page object 861 may be respectively connected via various URLs (Uniform Resource Locators) of different web pages, where a user may select the corporate logo, the menu bar, the advertisement, the image, the text and the graphic and display relevant screens of web pages on the touch screen 500.

Figure 16B:
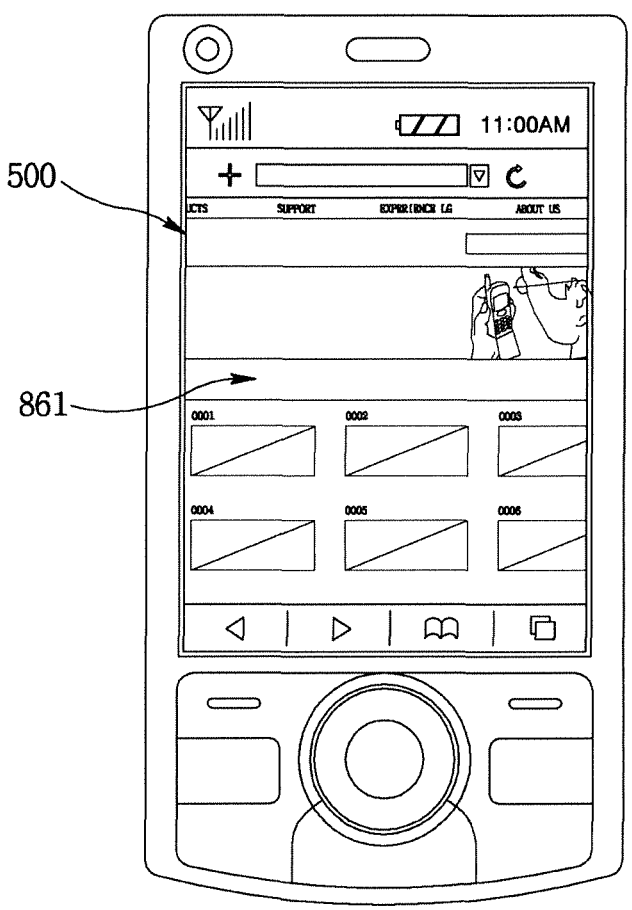

A check mark 511 defines an area where an input medium has directly touched a web page object 861. As illustrated in FIG. 16b, the controller 180 may determine the direct touch operation on the web object 861 and may display an enlarged view of the area of the web page object 861 where the direct touch was performed.

Figure 16C:
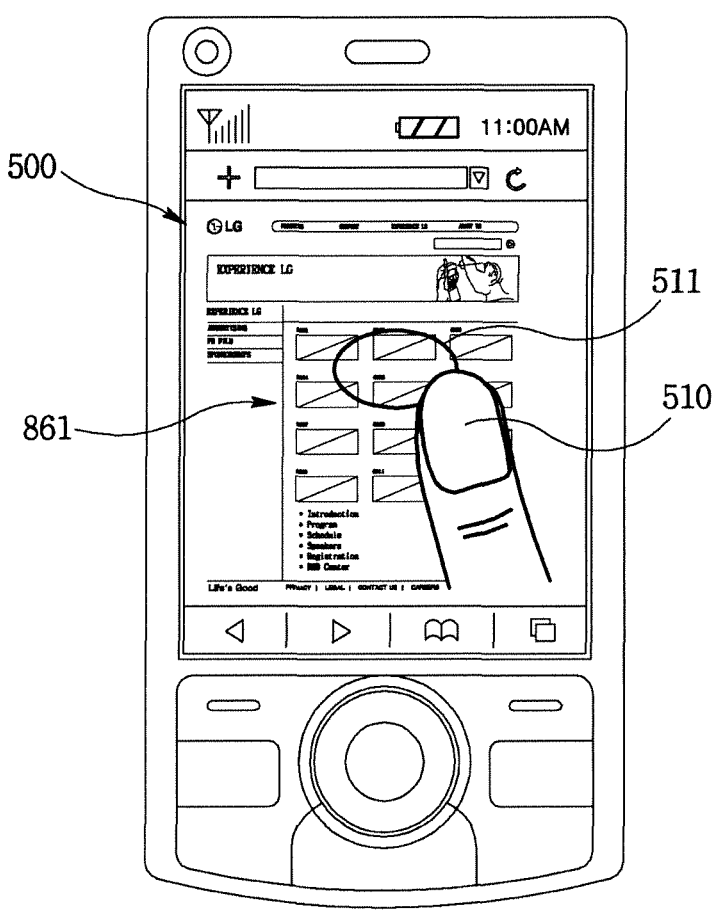

FIG. 16c illustrates a graphic user interface provided to a touch screen during a proximity touch operation of an input medium according to another embodiment of the present invention.

A selection marker 512 of FIG. 16c defines an area where an input medium 510 performs a proximity touch on the web page object 861 displayed on the touch screen 500 within a touch identification distance of the touch screen 500.

Figure 16D:
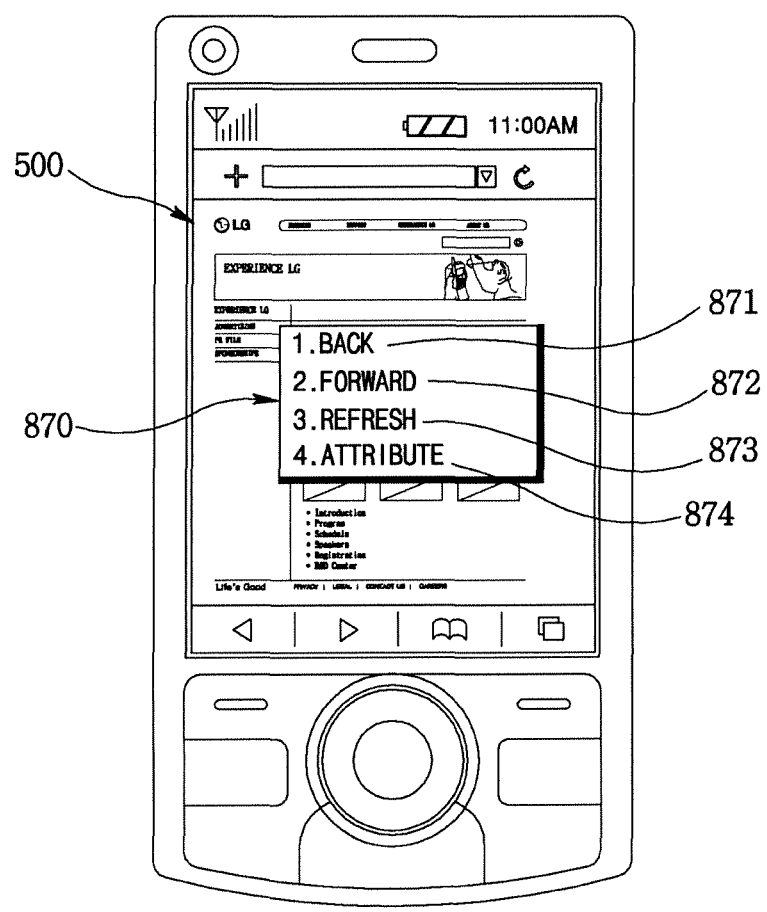

Thus, the controller 180, as illustrated in FIG. 16d, may determine the proximity touch operation and temporarily display a second level menu for instantly executing a frequently used function associated with the web browser 851 if the input medium 510 performs a proximity touch on the web page object 861 for a predetermined period of time.

Referring to FIG. 16d, the second level menu may be a list 870 of text objects including "1.back" 871 for returning to a web page visited before the web page object 861 was displayed on the touch screen 500, "2.forward" 872 for re-displaying the web page displayed before the "1.back" function was executed, "3.refresh" 873 for refreshing the currently displayed web page object 861 to the most current version of the web page, and "4.attribute" 874 for checking registration information such as protocol type of web page, format, address (URL), access status, preparation date, and refresh time. Thus, the user may use the input medium 510 to select and a desired function from the text objects 871-874 included in the list 870.

The web page object 861 illustrated in FIG. 16c corresponds to a first level menu, and the list 870 displayed on the touch screen 500 corresponds to a second level menu associated with the web page object 861.

Thus, a web page displayed before the currently-displayed web page object 851 may be re-displayed on the touch screen 500 if the input medium 510 performs a direct touch on the "1.back" text object 871.

Furthermore, the controller 180 may display on the touch screen 500 the screen illustrated in FIG. 16c, if the input medium 510 deviates from the touch identification distance of the touch screen 500 without direct touching any one text object when the list 870 is displayed on the touch screen 500.

Figure 17A:
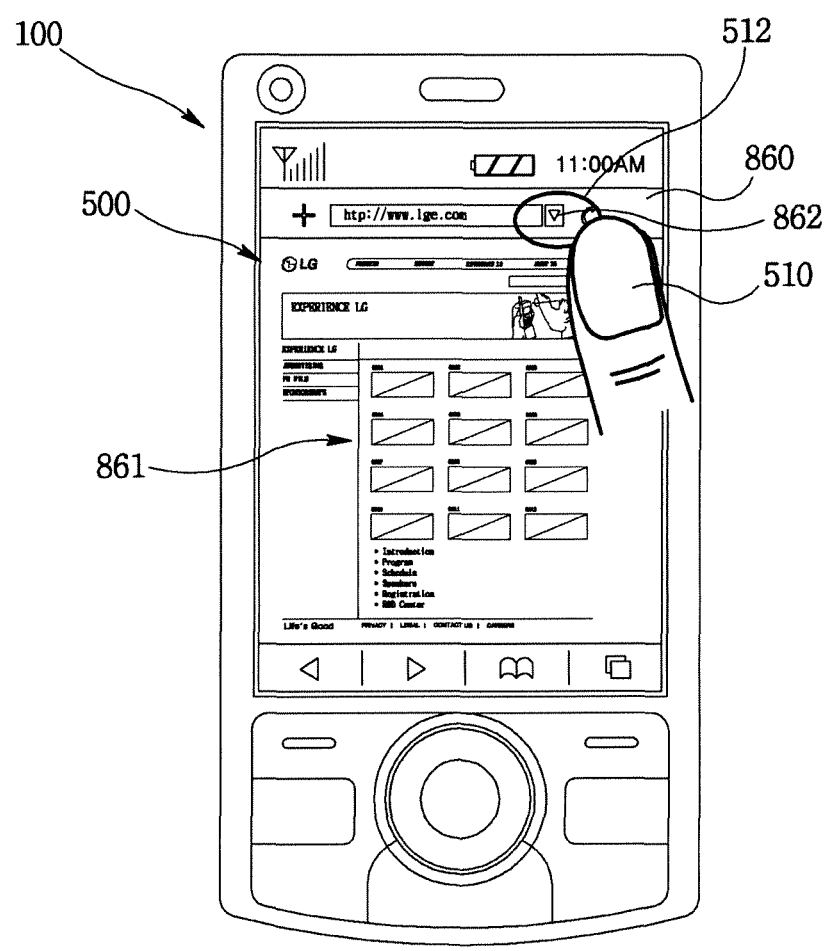
FIGS. 17a and 17b are schematic drawings illustrating a method for providing a graphic user interface using a mobile terminal capable of sensing a proximity touch sensing function according to an embodiment of the present invention.
Figure 17B:
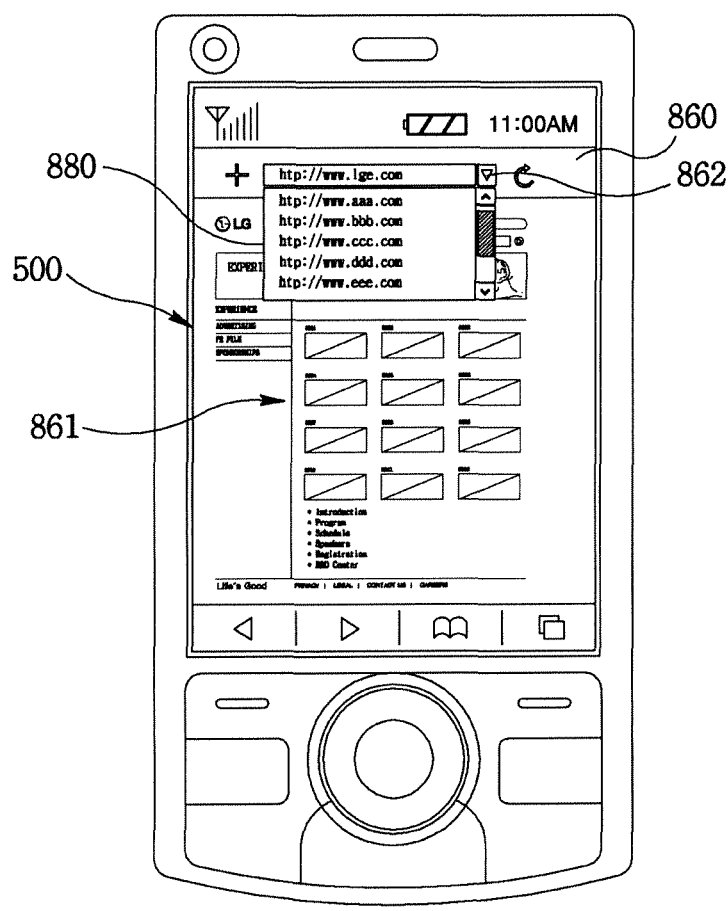

FIGS. 17a and 17b are schematic drawings illustrating a method for providing a graphic user interface using a mobile terminal capable of sensing a proximity touch sensing function according to another embodiment of the present invention.

A selection marker 512 in FIG. 17a defines an area where an input medium 510 performs a proximity touch on a predetermined icon 862 formed within the web browser 860 displayed on the touch screen 500 within a touch identification distance of the touch screen 500. The icon 862 may be formed at a right end of an address input window 863.

Thus, the controller 180, as illustrated in FIG. 17b, may determine a proximity touch operation and may display one or more web address lists 880 recently connected to the mobile terminal 100, if the input medium 510 performs a proximity touch on the icon 862 for a predetermined period of time. The web address list 880 may be formed at a lower end of the address input window 863.

The icon 862 illustrated in FIG. 17a corresponds to a first level menu and the web address list 880 of the icon 862 corresponds to a second level menu associated with the icon 862.

Thus, the controller 180 may determine the direct touch operation and temporarily display a web page corresponding to the directly touched web address to the web browser 860, if the input medium 510 direct touches any one web address included in the web address list 860.

Furthermore, the controller 180 may remove the web address list 880 from the touch screen 500, if the input medium 510 deviates from the touch identification distance of the touch screen 500 without direct touching a web address included in the web address list 880.

Figure 18B:
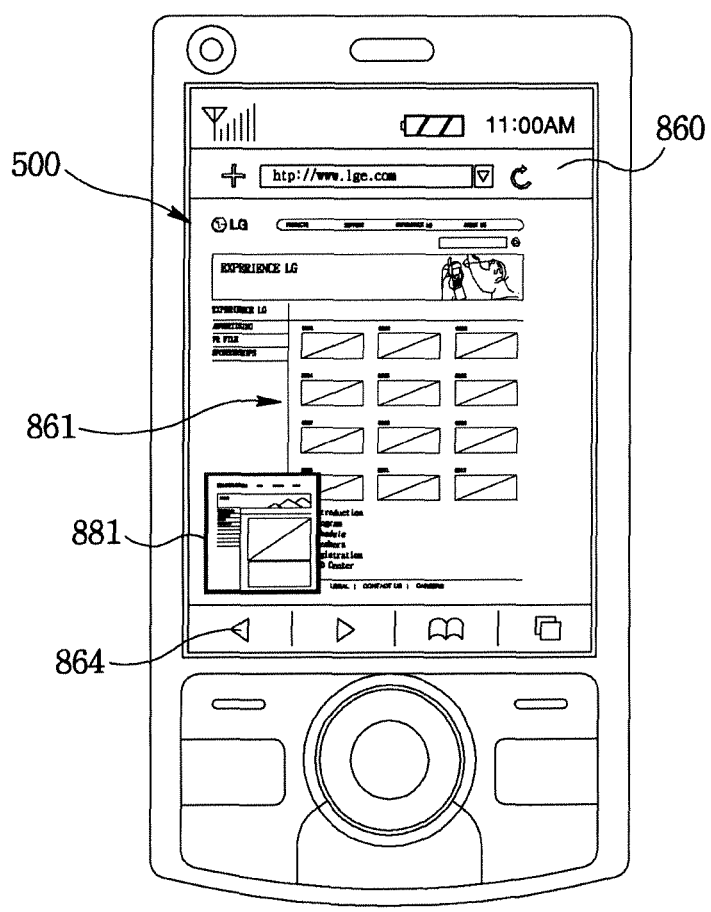
FIGS. 18a and 18b are schematic drawings illustrating a method for providing a graphic user interface using a mobile terminal capable of sensing a proximity touch sensing function according to an embodiment of the present invention.
Figure 18A:
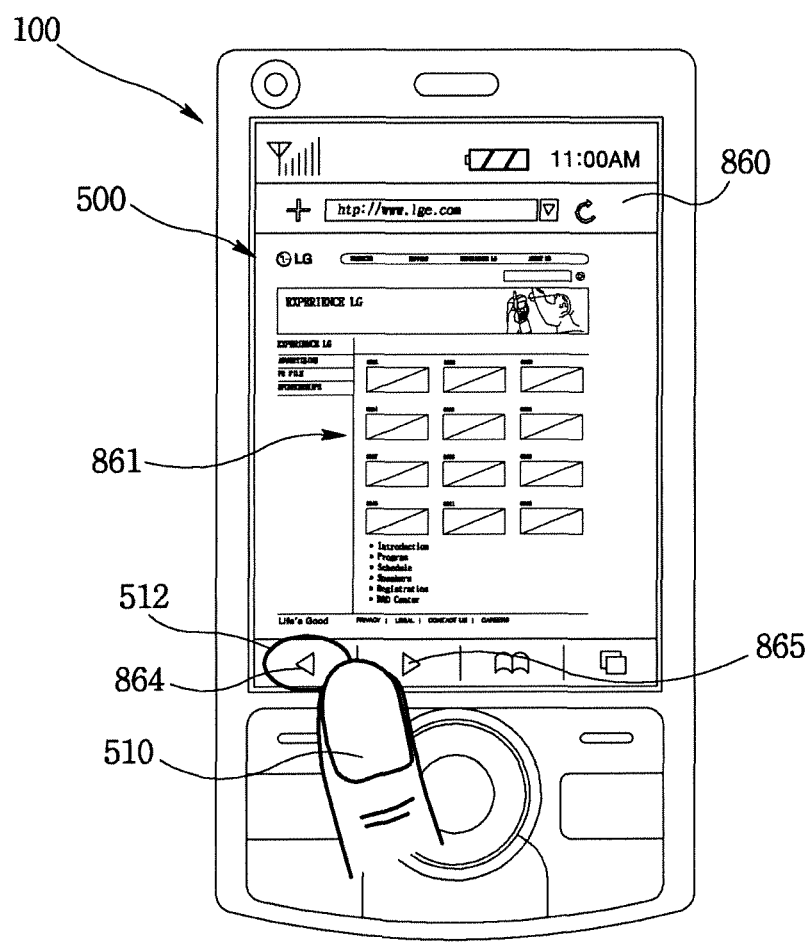

FIGS. 18a to 18b are schematic drawings illustrating a method for providing a graphic user interface using a mobile terminal capable of sensing a proximity touch sensing function according to another embodiment of the present invention.

As illustrated in FIGS. 18a and 18b, the web browser 860 may be formed with first and second web page movement icons 864, 865.

The first web page movement icon 864 provides a function of displaying a web page visited before a web page currently displayed on the touch screen 500. The second web page movement icon 865 provides a function of re-displaying on the touch screen 500 a web page seen before the function of the first web page movement icon 864 is executed. Furthermore, as illustrated in FIG. 18b, a pre-view image 881 may be displayed if the input medium 510 performs a proximity touch on the first or second web page movement icons 864, 865.

A selection marker 512 in FIG. 18a defines an area where the input medium 510 performs a proximity touch on the first web page movement icon 864 displayed on the touch screen 500 within a touch identification distance of the touch screen 500.

Thus, the controller 180 may determine the proximity touch operation and may display a preview image 881 of a web page last visited before the web page currently displayed on the touch screen 500 if the input medium 510 performs a proximity touch on the first web page movement icon 864 for a predetermined period of time.

The first web page movement icon 864 corresponds to a first level menu and the preview image 881 corresponds to a second level menu associated with the first web page movement icon 864.

The controller 180 may determine the direct touch operation and display a web page in an enlarged format corresponding to the preview image 881 on the web browser 860, if the input medium 510 performs a direct touch on the preview image 881.

Additionally, the controller 180 may remove the preview image 881 from the touch screen 500 if the input medium 510 deviates from the touch identification distance of the touch screen 500 without direct touching the preview image 881.

Figure 19:
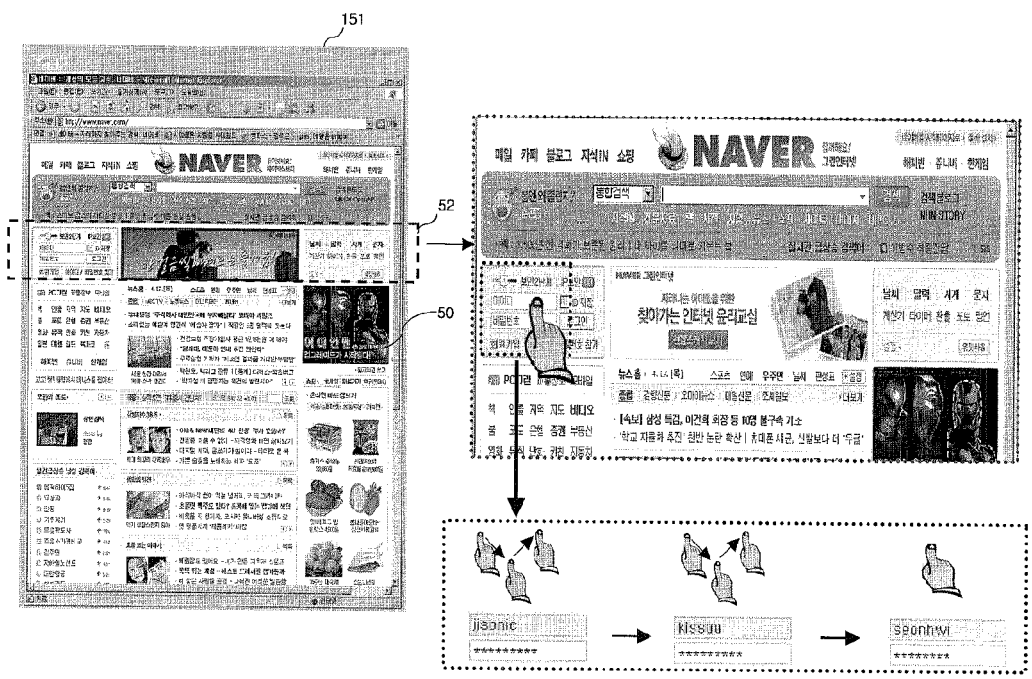
FIG. 19 is a schematic drawing illustrating a method for providing a graphic user interface using a mobile terminal according to an embodiment of the present invention.

FIG. 19 is a schematic drawing illustrating a method for providing a graphic user interface using a portable terminal capable of sensing proximity touch sensing function according to a ninth exemplary implementation of the present disclosure. Referring to FIG. 19, a user may use a pointer (e.g., a finger) to display a window or a particular website screen 50 on the touch screen 500.

Under this state, in a case the finger proximately touches a point on the screen 50, i.e., an ID window of the log-in window 52, the controller 180 automatically inputs a most-recently inputted (or a most frequently inputted) ID (jjsonic) and a relevant password from the previously used IDs and passwords.

Successively, in a case the user moves the finger to an upward direction within the proximity touch detection regions D1~D3, the log-in window is inputted with a next-recently inputted (or frequently inputted) ID (kissuu) and a relevant password based on the finger movement.

In a case the user-inputted ID (kissuu) and the password are touched by the finger, the controller 180 completes the input of the ID and the password. Furthermore, in a case the proximity touch detection region is deviated (the proximity touch is released) under a state of the finger not being actually touched, the controller 180 may control in such a manner that an ID (or password) list disappears, or the inputted ID and password disappear.

Figure 20:
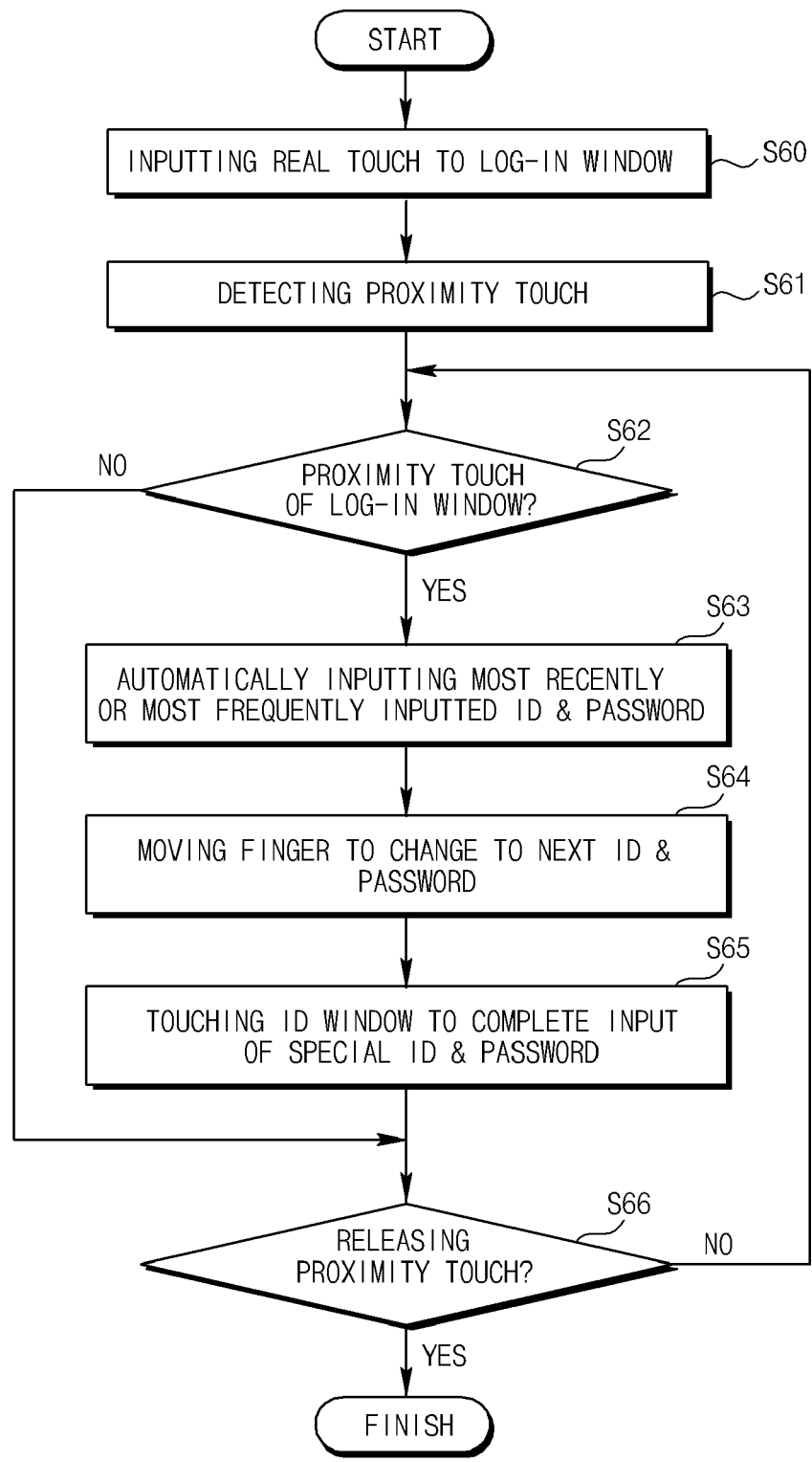
FIG. 20 is a flowchart illustrating a method for inputting information into a log-in window using proximity touch according to an embodiment of the present invention.

FIG. 20 is a flowchart illustrating a method for inputting information into a log-in window using proximity touch according to an embodiment of the present invention. FIG. 20 exemplifies that, in a case a finger proximately approaches the log-in window, the most recently or most frequently inputted ID and password are automatically inputted, and changed using the proximity touch.

In a case a pointer inputs a real touch to a predetermined region of the display 151, i.e., the log-in window of the website, i.e., the ID window and password window while the special website screen 50 is being displayed on the display 151, the sensing unit 140 detects relevant touch. The controller 180 displays an imaginary keypad at a lower portion of the display 151 based on a sensing result by the sensing unit 140, and displays the ID window and the password window (S60).

Under this circumstance, in a case the pointer proximately approaches and a predetermined time elapses, the controller 180 automatically inputs the most recently or most frequently inputted ID and password to the ID window and the password window (S61, S62, S63).

Thereafter, in a case the user moves to a special direction at a predetermined speed within the proximity touch detection positions (D1~D3) and within a predetermined time, the controller 180 recognizes that it is a motion of pressing a button, and inputs the next most recently and most frequently inputted ID and password to the log-in window (i.e., changes the ID and password) (S64).

In a case the user touches the log-in window under this circumstance, the controller 180 completes the input of ID and password (S65). Furthermore, according to a further embodiment, only the ID is inputted to insure the security, instead of simultaneously inputting an ID and relevant password.

Hence, according to one or more embodiments, the previously used ID and/or password can be easily input using a simple motion of approaching the pointer to the ID window, unlike the conventional MS explorer where 'down arrow (↓)' icon (display) positioned at a right portion of the log-in window is separately selected.

The mobile terminal capable of sensing a proximity touch and a method for providing a graphic user interface using the same according to the present invention are not limited to the configurations and methods shown in the above-described embodiments, and various changes are possible without departing from the principles set forth herein. Part or all of the embodiments may selectively be configured in combinations thereof. Furthermore, the mobile terminal capable of sensing a proximity touch and a method for providing a graphic user interface using the same according to the present invention are not limited to the mobile terminal but may be applied to various other functions of the mobile terminal.

Various embodiments will be described in conjunction with a mobile terminal. However, such teachings apply also to other types of electronic devices. Examples of such devices include portable devices, digital broadcast receiving terminals, MP3 players, personal digital assistants (PDA), portable multimedia players (PMP), and the like.

Moreover, various methods will be described in conjunction with regard to a mobile terminal. However, it is to be understood that embodiments of the present invention are not so limited and may alternatively be implemented using other types of electronic devices, such as those noted above.

The foregoing embodiments and advantages are merely exemplary and are not to be construed as limiting the present invention. The present teaching may be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for providing a graphic user interface using a mobile terminal, the method comprising:
    sensing a proximity touch over an input window displayed on a touch screen;
    determining a duration of time of the sensed proximity touch;
    displaying a most frequently input identifier in the input window when the determined duration of time is greater than or equal to a predetermined duration of time;
    sensing a proximity gesture over the input window in which the most frequently input identifier is displayed, concurrent with the sensed proximity touch;
    in response to sensing the proximity gesture, ceasing the display of the most frequently input identifier and displaying a next most frequently input identifier in the input window; and
    ceasing the display of at least the most frequently input identifier or the next most frequently input identifier when the sensed proximity touch subsequently deviates from a touch recognition distance relative to the touch screen without a direct touch being received.

2. The method of claim 1, further comprising:
    determining that the direct touch is received on at least the display of the most frequently input identifier or the display of the next most frequently input identifier; and
    executing a function associated with the most frequently input identifier if it is determined that the direct touch is received on the display of the most frequently input identifier; and
    executing a function associated with the next most frequently input identifier if it is determined that the direct touch is received on the display of the next most frequently input identifier.

3. A mobile terminal comprising:
    a touch screen configured to:
        display an input window;
    a sensing unit configured to:
        sense a proximity touch over the input window, and
        sense a direct touch to the input window; and
    a controller configured to:
        determine that the proximity touch occurred for a predetermined period of time,
        control the touch screen to display a most frequently input identifier in the input window in response to determining that the proximity touch occurred for the predetermined period of time, wherein the most frequently input identifier is associated with the input window,
        sense a proximity gesture over the input window in which the most frequently input identifier is displayed, concurrent with the sensed proximity touch,
        in response to sensing the proximity gesture, cease the display of the most frequently input identifier and display a next most frequently input identifier in the input window, wherein the next most frequently input identifier is associated with the input window,
        determine whether the direct touch occurred to the input window in which at least the most frequently input identifier or the next most frequently input identifier is displayed, and
        control the touch screen to cease the display of at least the most frequently input identifier or the next most frequently input identifier when an input medium performing the proximity touch deviates from a touch recognition distance relative to the touch screen without the direct touch being sensed.

* * * * *